United States Patent
Lorenz et al.

(10) Patent No.: US 10,817,245 B2
(45) Date of Patent: Oct. 27, 2020

(54) TEMPORARY USE OF AN ELECTRONIC BILLBOARD IN AN INTERNET OF THINGS COMPUTING ENVIRONMENT

(71) Applicant: INTERNATIONAL BUSINESS MACHINES CORPORATION, Armonk, NY (US)

(72) Inventors: Simon Lorenz, Biebertal (DE); Ralf Eberhard, Kelsterbach (DE); Ulf Troppens, Mainz (DE); Manfred Haubrich, Gensingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 15/970,002

(22) Filed: May 3, 2018

(65) Prior Publication Data
US 2019/0339925 A1 Nov. 7, 2019

(51) Int. Cl.
*G06F 3/14* (2006.01)
*G06Q 30/02* (2012.01)
*H04W 4/021* (2018.01)

(52) U.S. Cl.
CPC ....... *G06F 3/1454* (2013.01); *G06Q 30/0261* (2013.01); *G06Q 30/0272* (2013.01); *G06Q 30/0273* (2013.01); *H04W 4/021* (2013.01)

(58) Field of Classification Search
CPC ..... G06F 3/1454; G06F 3/1462; G06F 16/178
See application file for complete search history.

(56) References Cited

U.S. PATENT DOCUMENTS

| 7,038,637 B1* | 5/2006 | Eller ...................... G06Q 30/02 345/2.1 |
| 2002/0116717 A1 | 8/2002 | Eller et al. |
| 2008/0233984 A1* | 9/2008 | Franklin ................. H04L 51/38 455/466 |
| 2008/0282155 A1* | 11/2008 | Kempanna .......... G06F 16/9535 715/273 |
| 2014/0149221 A1* | 5/2014 | Rycyna, III ........ G06Q 30/0264 705/14.61 |
| 2015/0149585 A1* | 5/2015 | Zhang .................... G06Q 10/10 709/217 |

(Continued)

FOREIGN PATENT DOCUMENTS

WO  2002029665 A1  4/2002

OTHER PUBLICATIONS

Boring et al., "Touch projector: mobile interaction through video," Proceedings of the SIGCHI Conference on Human Factors in Computing Systems, Apr. 10-15, 2010 (2 pages).

(Continued)

*Primary Examiner* — Kevin M Nguyen
(74) *Attorney, Agent, or Firm* — Griffiths and Seaton PLLC

(57) ABSTRACT

Embodiments for using an electronic billboard in an Internet of Things ("IoT") computing environment by a processor. A wireless communication link may be established between a user equipment (UE) and the electronic billboard. Currently displayed content may be temporarily interrupted with user-provided content uploaded from the UE to the electronic billboard according to one or more protocols.

17 Claims, 19 Drawing Sheets

TIME-BASED SYNCHRONIZATION

(56) References Cited

U.S. PATENT DOCUMENTS

2016/0294906 A1   10/2016  Levinson et al.
2016/0315986 A1   10/2016  Chen
2017/0206562 A1*  7/2017  Mowry .............. G06Q 30/0255

OTHER PUBLICATIONS

"Rent Video Wall Displays to Broadcast Your Message in High Resolution," abcomrents.com, May 15, 2013 (2 pages).
"Video Wall Rentals," smartsourcerentals.com, Nov. 5, 2017 (2 pages).

* cited by examiner

TEMPORARY USE OF AN ELECTRONIC BILLBOARD IN AN INTERNET OF THINGS COMPUTING ENVIRONMENT

BACKGROUND OF THE INVENTION

Field of the Invention

The present invention relates in general to computing systems, and more particularly, to various embodiments for using an electronic billboard in an Internet of Things ("IoT") computing environment by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

As great strides and advances in technologies come to fruition, the greater the need to make progress in these systems advantageous for efficiency and improvement such as, for example, for using electronic billboards (e.g., "video walls").

SUMMARY OF THE INVENTION

Various embodiments for using an electronic billboard in an Internet of Things ("IoT") computing environment by a processor are provided. In one embodiment, by way of example only, a method for using an electronic billboard in an IoT computing environment by a processor is provided. A wireless communication link may be established between a user equipment (UE) and the electronic billboard. Currently displayed content may be temporarily interrupted with user-provided content uploaded from the UE to the electronic billboard according to one or more protocols.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
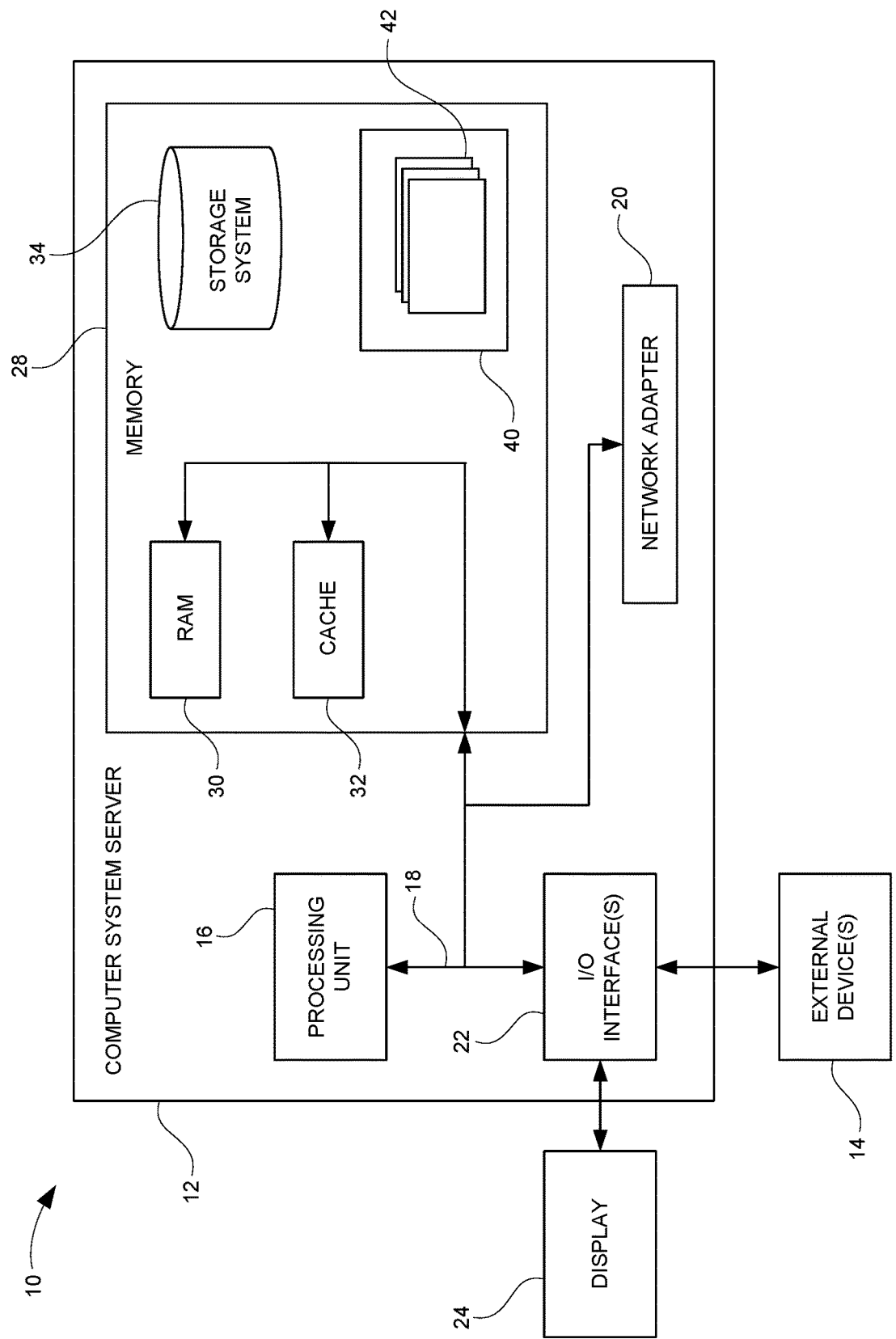
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively, a distributed control system such as one running over a cloud computing environment.

The prolific increase in use of IoT appliances in computing systems, particularly within the cloud computing environment, in a variety of settings provide various beneficial uses to a user. Various IoT appliances may be used for personal or commercial purposes. For example, commercial advertising is a multi-billion dollar market and great efforts by sponsors are made to gain access to the "best spot" (e.g., geographical regions having the greatest exposure for viewing or time slots having the highest ratings) or reach for an advertisement such as, for example, billboard or commercial advertisement. In one aspect, electronic billboards (e.g., "e-signs" or "video walls") function as an attractor element to advertise for various entities. The electronic billboards may include a panel that can display via one or more lighting devices (e.g., a light-emitting diode "LED") or any other device for lamination of any content. Video walls may be located at various locations that are visibly seen and reached by many people. Video wall displays used for advertisement are required to be rented for a certain time. Thus, only those entities (e.g., businesses or organizations) having rented the video walls are enabled to use the electronic. However, currently, electronic billboards fail to provide on-demand access to other entities within an Internet of Things ("IoT") computing environment such as, for example, tourists, so as to enable these other entities the ability to display their own content for a selected amount of time. Accordingly, a need exists to enable a user of a wireless communication device, which may be in communication with the electronic billboard, to upload content to the electronic billboard so as, for example, to take a picture of the scene/geographical area that includes the electronic billboard that actually also shows their picture on the display screen of the electronic billboard.

Accordingly, various embodiments are provided for using an electronic billboard in an Internet of Things ("IoT") computing environment by a processor. In one embodiment, a wireless communication link may be established between a user equipment (UE) and the electronic billboard. Currently displayed content may be temporarily interrupted with user-provided content uploaded from the UE to the electronic billboard according to one or more protocols.

In this way, an electronic billboard allows a third party to reuse a display of the electronic billboard for a selected period of time (e.g., less than a defined threshold such as, for example, 3 seconds). A user is enabled to upload user-provided content (e.g., an image uploaded and displayed) from a user equipment ("UE") (e.g., a wireless communication device such as, for example, a smartphone, tablet, computer, etc.) to the electronic billboard for display. A camera device associated with the UE may be activated and may capture an image or video of the user that may also include the LED-Wall (e.g., electronic billboard) with the displayed user content in the background. In this way, the electronic billboard provides on-demand access and/or temporary access to the third parties (e.g., other entities not having rented the electronic billboard for advertising) so as to increase the profitability of the electronic billboard. That is, the electronic billboard may be re-rented to a "secondary user" (e.g., 3rd party), while the content of "1st customers" (e.g., customers having rented the electronic billboard to display primary content) is visible nearly 100% of the time.

In one aspect, the present invention provides for intelligent or "smart" handshaking between an electronic billboard and a UE (e.g., camera, smartphone) to take a picture exactly in the moment the private content is displayed in order to create public video walls that allow individuals to display user-provided content for a very short limited amount of time, without impacting the primary displayed content and without being noticed by other individuals.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
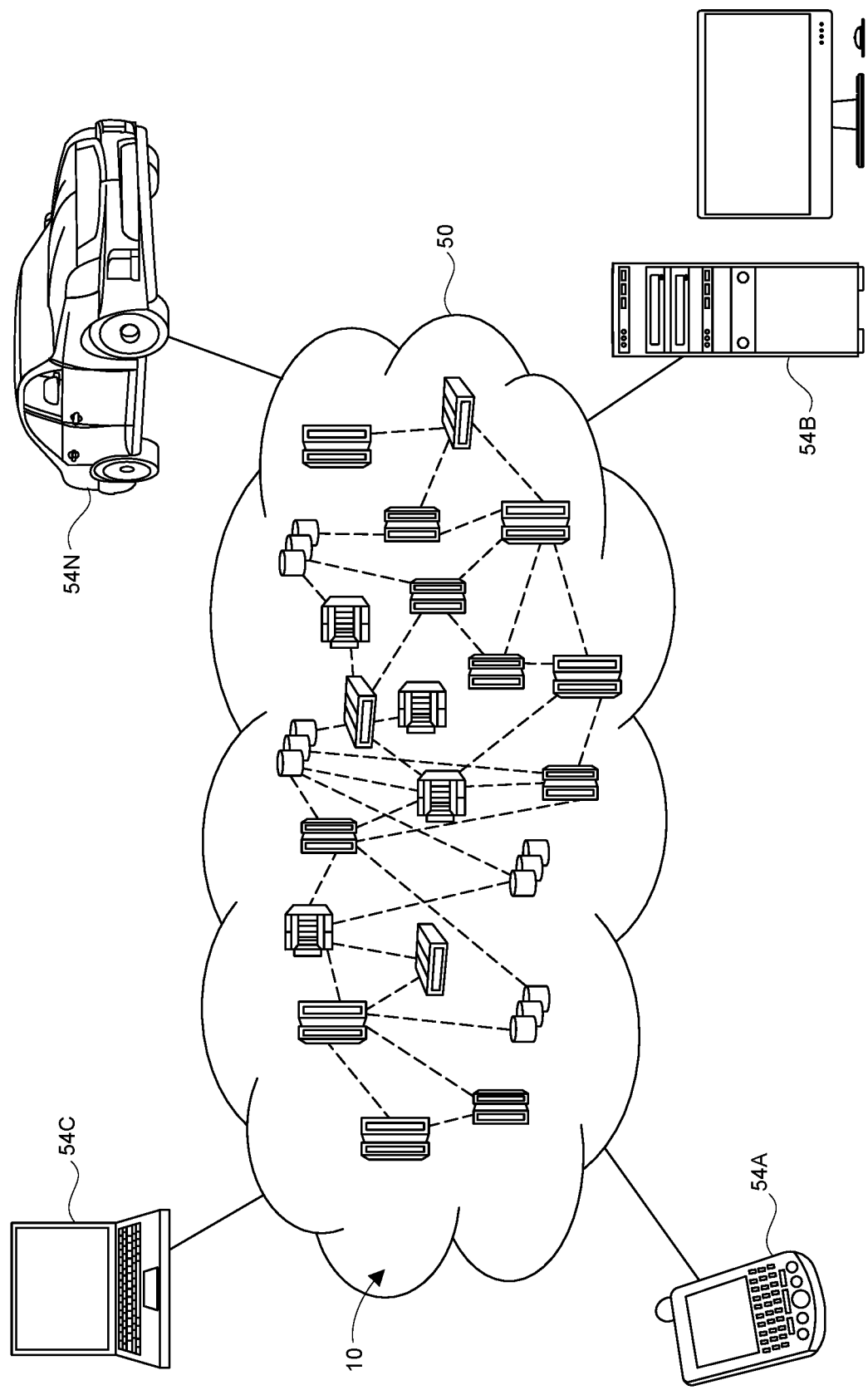
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
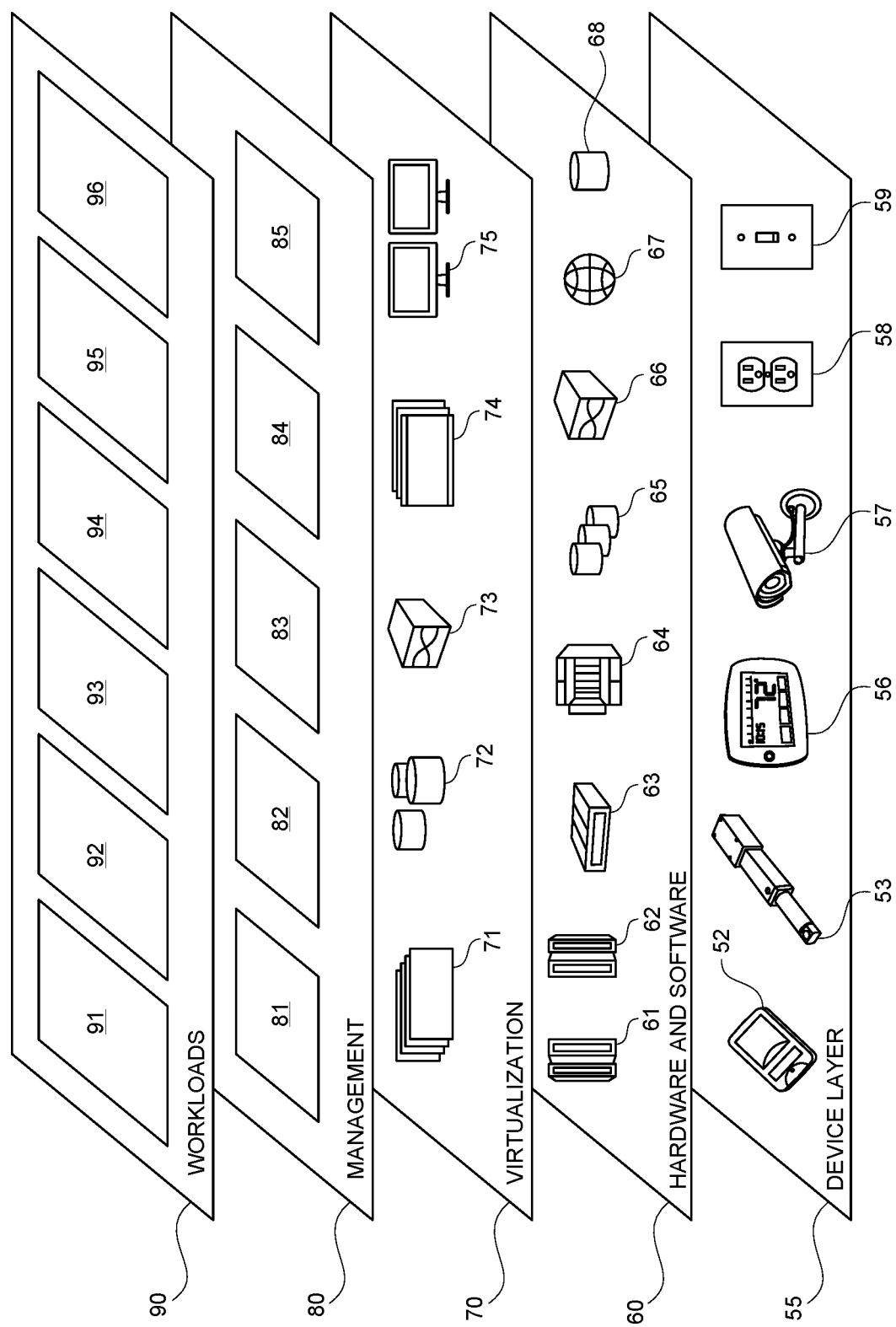
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various electronic billboard reuse workloads and functions 96. One of ordinary skill in the art will appreciate that the electronic billboard reuse workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for re-using an electronic billboard in an IoT computing environment. In one aspect, a wireless communication link may be established between a user equipment (UE) and the electronic billboard. Currently displayed content may be temporarily interrupted with user-provided content uploaded from the UE to the electronic billboard according to one or more protocols.

Figure 4:
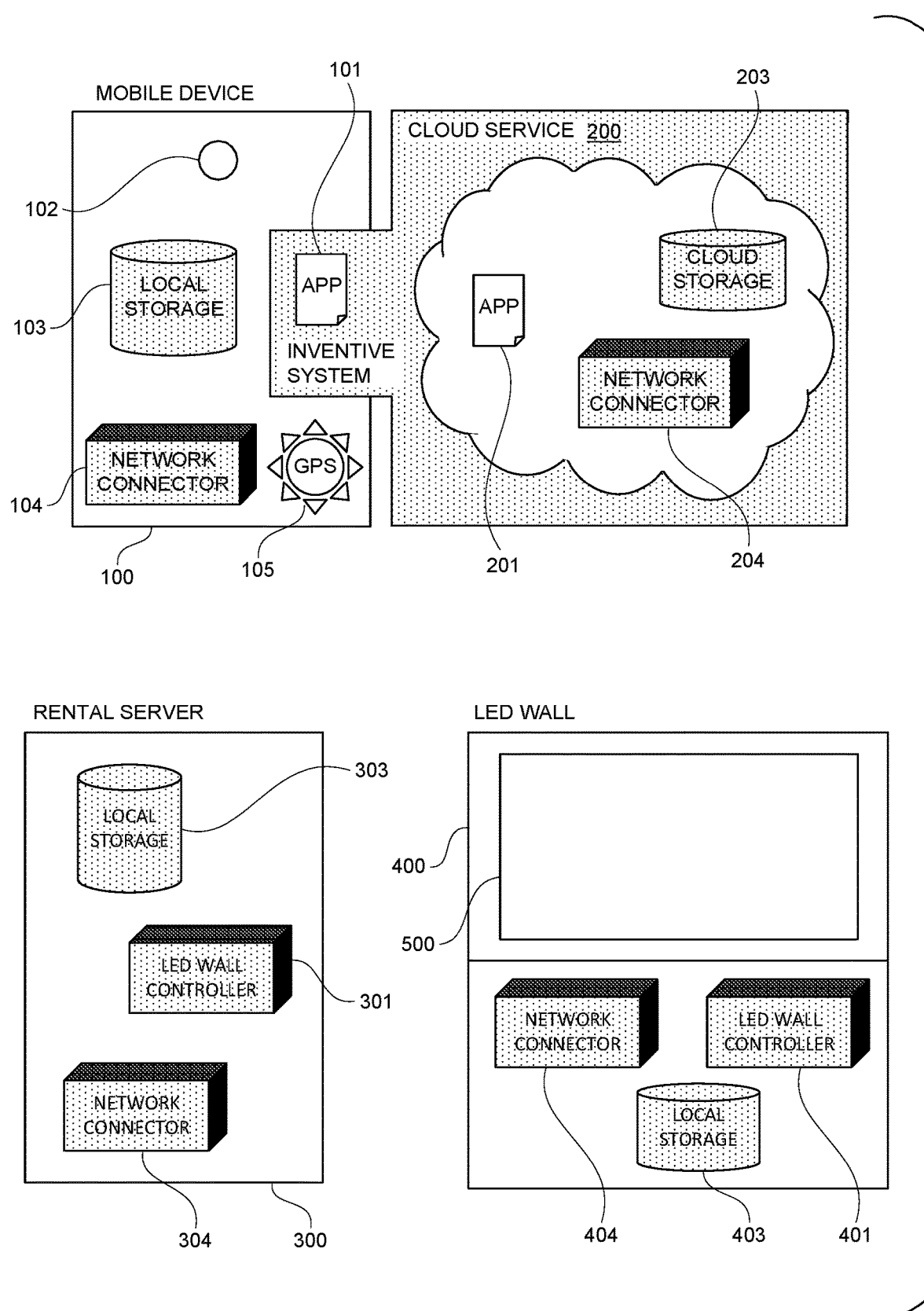
FIG. 4 is a diagram depicting various user hardware and computing components functioning in accordance with aspects of the present invention.

FIG. 4 is a diagram depicting various user hardware and computing components. As will be seen, many of the functional blocks may also be considered "modules" or "components" of functionality, in the same descriptive sense as has been previously described in FIGS. 1-3. For example, computer system/server 12 of FIG. 1 may be included in FIG. 4 and may be connected to other computing nodes, and/or one or more Internet of Things (IoT) devices over a distributed computing network.

As depicted in FIG. 4, a mobile device 100, a cloud computing service 200 ("cloud service"), a rental server 300, and a video wall 400 ("LED wall") are in communication with each other. The mobile device 100 may include an image capturing device (e.g., camera 102), a mobile application 101, a network connector 104, a storage 103 (e.g., a local storage to the rental server 300), a global positioning satellite ("GPS") device 105, and/or other components as required.

The rental server 300 may include a video wall controller (e.g., a light-emitting diode "LED" wall controller 301) that may decide when and what type of content 500 (e.g., primary content of a primary user and/or secondary content of a secondary user or third party) is displayed on the LED wall 400. The rental server 300 further contains a network connector 304 (e.g., any wired or wireless network connection) that enables the rental server 300 to connect to the LED wall 400. A local storage 303 (e.g., local to the rental server 300) may also be included in the rental server 300 to store the content that should be sent to the LED wall 400. The local storage 303 may also be a cloud storage.

In one aspect, the LED wall 400 may include an LED wall controller 401 that communicates via a network connector 404 with the video wall server controller 301. A local storage 403 may store and hold various content 500 that is and/or may be displayed on the LED wall 400. Again, the local storage 403 may also be any storage connected, such as cloud storage.

In one aspect, the LED wall 400 may exclusively display an advertisement based on an advertisement contract between a renter and an advertisement service provider who owns the rental server 300 and the LED wall 400. Such contracts may be closed for a defined period of time (e.g., greater than one day) and there is no direct connection between the renter and the rented LED wall 400. Said differently, the renter does not have direct (live) influence on the content 500 displayed on the LED wall 400.

In an additional aspect, FIG. 4 enables the reuse of an existing advertisement infrastructure on the LED wall 400 for personal, short term usage using an IoT computing network and devices. For example, one or more UEs (e.g., mobile devices) such as, for example, mobile device 100 may be enabled to directly communicate with the LED wall 400 or a service running in a cloud computing environment or service such as, for example, cloud service 200. The mobile device 100 may execute an application 101 (e.g., mobile application 101) that may establish a communication link (e.g., a connection) to connect via a network connector 104 to the cloud service 200 (e.g., via network connector 204).

In an alternative embodiment, direct network connections from the mobile device 100 to the LED wall 400 may be established without using the cloud service 200 or the rental server 300. Different content provided by the mobile device 100 may be uploaded to the LED wall 400 as long as the mobile device 100 is within a geographical region of the LED wall 400.

The application 101 may connect to either the cloud service application 201, which is connected to the rental server 300, and/or directly connect to the LED wall 400. The application 101 may verify and check with the LED wall controller 301 if the display of the LED wall 400 may be rented for a selected period of time. That is, the LED wall 400 may temporarily interrupt current and primary content (of a primary user) and display content with user-provided content (of a secondary user (e.g., 3rd party)) uploaded from the mobile device 100 to the LED wall 400 according to one or more protocols. If the LED wall 400 is available, the LED wall books the display of the user-provided content.

With the mobile application 101, a user can select which content the user wants to display on the LED wall 400. The user-provided content may be stored on the mobile device 100 and/or in a cloud storage 203.

If the user-provided content (e.g., an image or video) from the mobile device 100 is selected, the user-provided content may be uploaded into the cloud storage 203. The cloud service application 201 may upload the user-provided content to the rental server 300, which provides the user-provided content to the LED wall 400. The user-provided content may be evaluated, filtered by the rental service provider (i.e., sensitive or sexual content), on the LED wall controller 301 and/or within the LED wall controller 401.

Once the user-provided content is uploaded and available, the secondary user (e.g., secondary user (e.g., 3rd party)) may be enabled to temporarily interrupt the primary content displayed on the LED wall 400 and change the user-provided content (e.g., secondary content from a secondary user) for a selected period of time according to one or more protocols (e.g., an interruption service fee agreement when requesting the service). In one aspect, an interruption time for temporarily interrupting the currently displayed content (e.g., the primary content displayed on the LED wall 400) with user-provided content may be determined. The interruption time may be determined according to the one or more protocols. The one or more protocols include an interruption service fee, a geographical proximity between the UE and the electronic billboard, a handshaking operation between the UE and the electronic billboard, a time-based synchronization operation, a content-based synchronization operation, a steganography synchronization operation, a trigger impulse, or a combination thereof.

Figure 5:
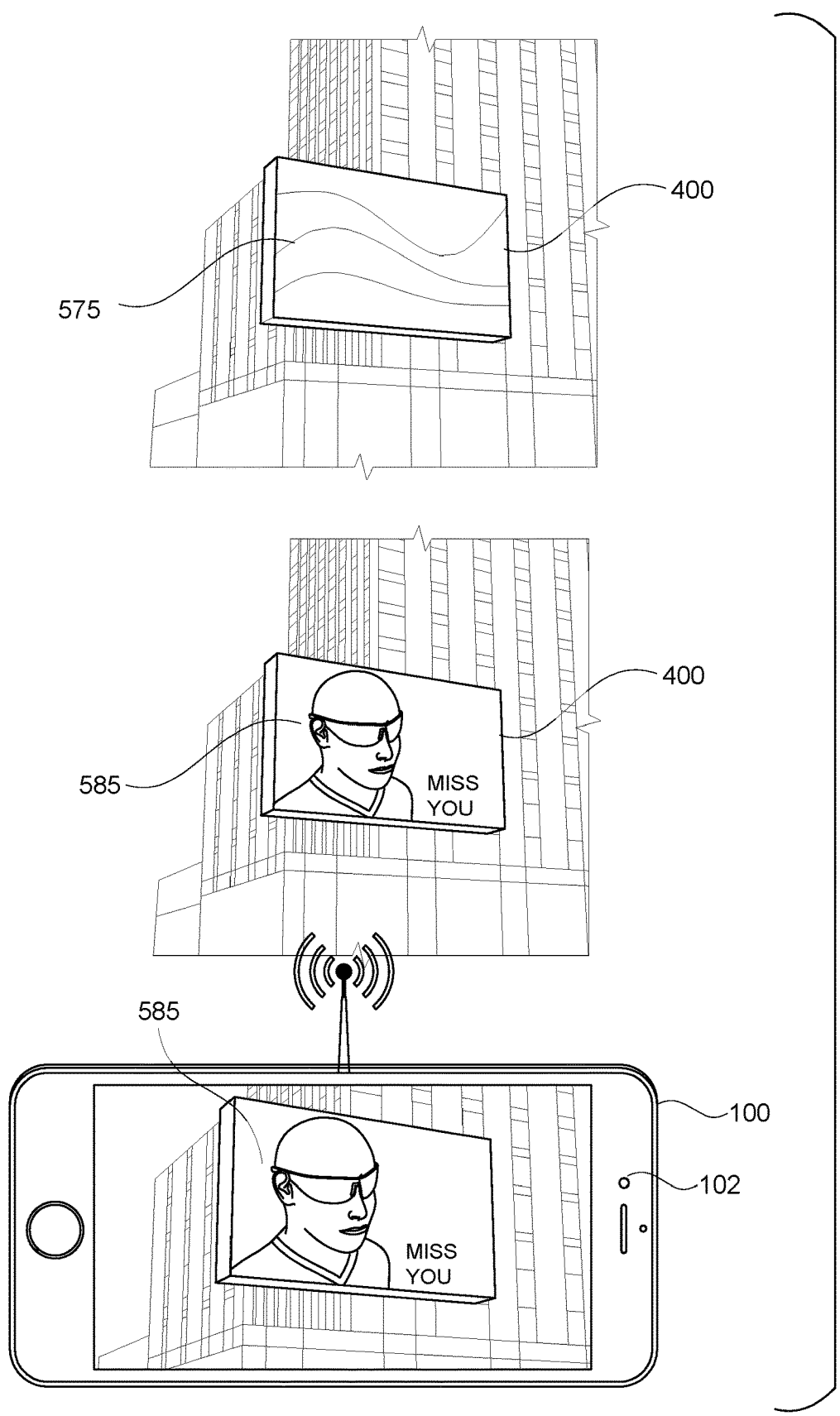
FIG. 5 is a block diagram depicting use of an electronic billboard in an Internet of Things ("IoT") computing environment according to an embodiment of the present invention.

Turning now to FIG. 5 is a block diagram depicting use of an electronic billboard (e.g., LED wall 400) in an Internet of Things ("IoT") computing environment using one or more aspects of FIG. 4. Accordingly, many of the functional blocks may also be considered "modules" or "components" of functionality, in the same descriptive sense as has been previously described in FIGS. 1-4. FIG. 5 illustrates the reuse of an electronic billboard such as, for example, LED wall 400 for personalized purposes of a third party (e.g., a secondary user of the LED wall 400) by providing user content that may include images, videos, a customized message, text messages, and/or stream content from the mobile device 100 in real-time to the display of the LED wall 400, while a picture and/or recording of the LED wall 400 and the surrounding scenery is depicted in view of an image capturing device of the mobile device 100. That is, the LED wall 400 may be displaying primary content 575. The LED wall may then temporarily interrupt (e.g., an interruption time) the display of the primary content 575 on the LED wall 400 and temporarily display secondary content 585 from a secondary user or third party.

The interruption time (e.g., which may also include a rental time) for a secondary user (e.g., 3rd party) can be reduced to a time threshold required to capture media data (e.g., pictures and/or videos). The LED wall 400 may require an interruption fee which may be based on an amount of media data (e.g., one or two pictures/videos), based on a selected time periods such as, for example, 10 seconds, 20 seconds, nth number of seconds, and/or if the mobile device 100 is within a wireless network area, and/or within a defined or detected distance within a geographical area or location or global positioning satellite ("GPS") detected distance. In one aspect, the primary user of the LED wall 400 (e.g., the original renter owning the advertising space on the LED wall 400 for a defined period of time) may be enabled to select a time period threshold in which time frames for the LED wall 400 can be used for alternative content (e.g., secondary user-provided content 585 from a secondary user), which then may reduce the actual usage cost of the primary user for advertising on the LED wall 400. In this way, the LED wall 400 enables one or more secondary users of UEs such as, for example, mobile device 100, in an IoT computing environment to provide secondary content 585 such as, for example, social media data, non-commercial data, and/or other user-provided content 585 for entertainment and social purposes. For example, a visitor to a new city or location may send a personalized message to a friend or family member with a customized message on an image that may be displayed on the LED wall 400 for a select period of time (e.g., during the interruption time) and the user may capture, on the mobile device 100 using an image capturing device 102, the user-provided content 585 displayed on the LED wall 400 and upload the new image to a social media network.

Following are various embodiments of the present invention depicting use of the various components of FIG. 4 such as, for example, the LED wall 400 according to each of a variety of protocols. Accordingly, many of the functional blocks may also be considered "modules" or "components" of functionality, in the same descriptive sense as has been previously described in FIGS. 1-5. For example, computer system/server 12 of FIG. 1 and each of the components described in FIGS. 3 and 4 may be included in FIGS. 6-11 and may be connected to other computing nodes, and/or one or more Internet of Things (IoT) devices over a distributed computing network. Repetitive description of like elements employed in other embodiments described herein may be omitted for sake of brevity.

More specifically, FIGS. 6-11 illustrate various embodiments using FIG. 4 for reusing the LED wall 400 according to each of the various protocols. Also, for example, FIGS. 6-11 may also include the mobile device 100, the cloud service 200, the rental server 300, and the LED wall 400. For example, the mobile device 100 may be in a defined range (e.g., within a communication network area and/or within defined GPS coordinates) of the LED wall 400 such as, for example, using orthogonal frequency-division multiplexing (OFDM) for signal transmission including the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. The mobile device 100 may also be in communication with the cloud service 200 (having a cloud service controller) and the rental server 300 for communicating with the LED wall 400.

Figure 6:
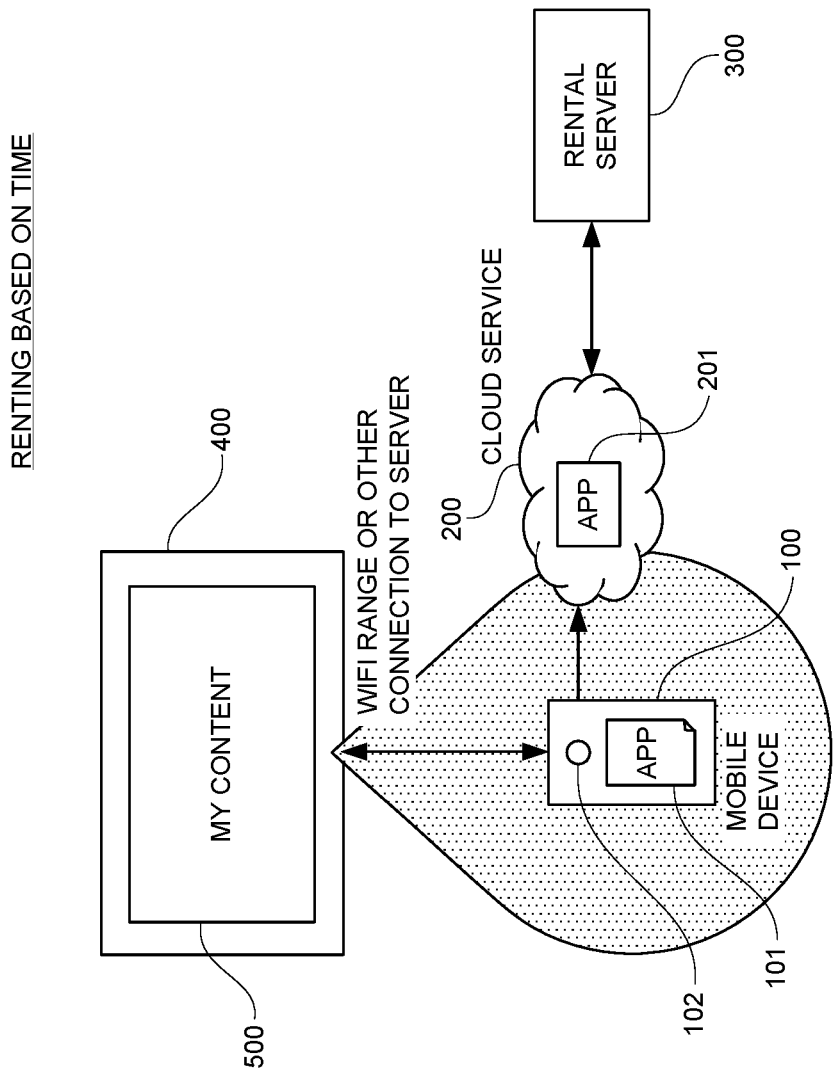
FIG. 6 is a block diagram depicting use of an electronic billboard according to an interruption fee based on time and/or geographical proximity in an Internet of Things ("IoT") computing environment according to an embodiment of the present invention.

Turning now to FIG. 6, a block diagram depicts use of an electronic billboard according to an interruption fee based on time and/or geographical proximity in an Internet of Things ("IoT") computing environment such as, for example, the computing environment described in FIG. 4. A secondary user (e.g., 3rd party) may select a video wall such as, for example, the LED wall 400 and display the content 500 ("my content" or "user-provided content") from the mobile device 100 (having the camera 102 and the mobile application 101 as described in FIG. 4), for a selectable amount of time (e.g., seconds or minutes). The mobile device 100 may be in a defined range (e.g., within a communication network area and/or within defined GPS coordinates) of the LED wall 400 such as, for example, using orthogonal frequency-division multiplexing (OFDM) for signal transmission including the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. Thus, the mobile device 100 may also be in communication with the cloud service 200 and the rental server 300 for communicating with the LED wall 400.

As soon as the content 500 is displayed on the LED wall 400, the secondary user (e.g., 3rd party) may capture an image and/or video. However, if the secondary user (e.g., 3rd party) uses the LED wall 400 for a time greater than the agreed upon or selected time period, the LED wall 400 may reduce the display time for the primary customer displaying the primary content (e.g., the advertisement content). This reduces the service provider's revenue with the primary user (e.g., original renter of the LED wall 400).

Figure 7:
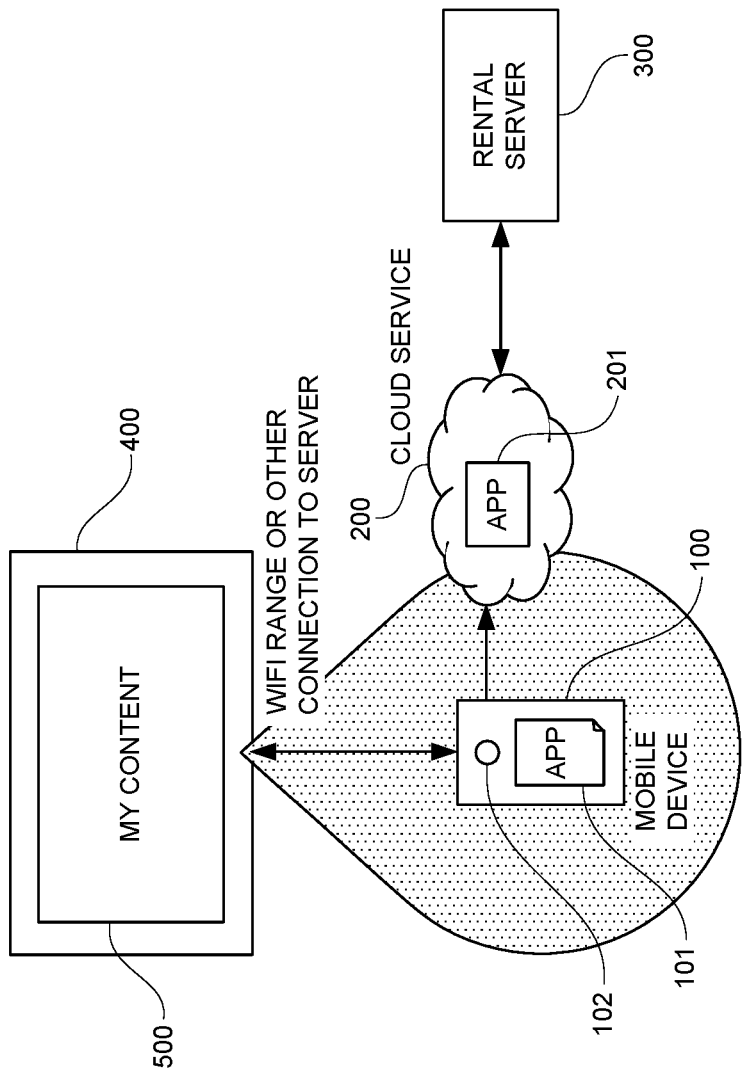
FIG. 7 is a block diagram depicting use of an electronic billboard according to a handshaking operation in an Internet of Things ("IoT") computing environment according to an embodiment of the present invention.

FIG. 7 is a block diagram depicting use of an electronic billboard for camera handshaking with the LED wall according to a handshaking operation in an Internet of Things ("IoT") computing environment such as, for example, the computing environment described in FIG. 4. Repetitive description of like elements employed in other embodiments of FIGS. 1-5 as described herein may be omitted for sake of brevity.

In one aspect, a secondary user (e.g., 3rd party) may provide an interruption service fee to temporarily interrupt currently displayed content on the LED wall 400 for a selected time range, and/or for a selected number of images or videos. The secondary user (e.g., 3rd party) may focus an image capturing device (e.g., camera 102) on the mobile device 100 to a selected location. By a trigger operation of the secondary user (e.g., 3rd party), the mobile device application 101 starts the camera 102 function on the mobile device 100 and indicates to the rental server 300 of the upcoming image or video capture (e.g., the upcoming camera shot). During a handshaking operation of the mobile application 101 and the LED wall controller 401, the handshaking operation may be validated indicating that the user-provided content is available and the LED wall 400 is enabled to display the user-provided content. As soon as the camera 102 of mobile device 100 commences capturing the images and/or videos (e.g., taking the picture), the mobile device application 101 may be notified of the image capturing and/or may detect the images being captured. The mobile device application 101 may indicate or communicate to the LED wall controller 401, via the network connectors 104 and 404, to display the new, user-provided content 500. After the selected time period, the camera 102 captures an image and/or video. Once the image and/or video is captured, the mobile device application 101 may be notified of the image capturing and/or may detect the images being captured. The mobile device application 101 may indicate to the LED wall controller 401, via the network connectors 104 and 404, to display the primary content of the primary user (e.g., advertisement renter of the LED wall 400), which may reduce the amount of time the LED wall 400 is used by the secondary user (e.g., 3rd party).

Figure 8:
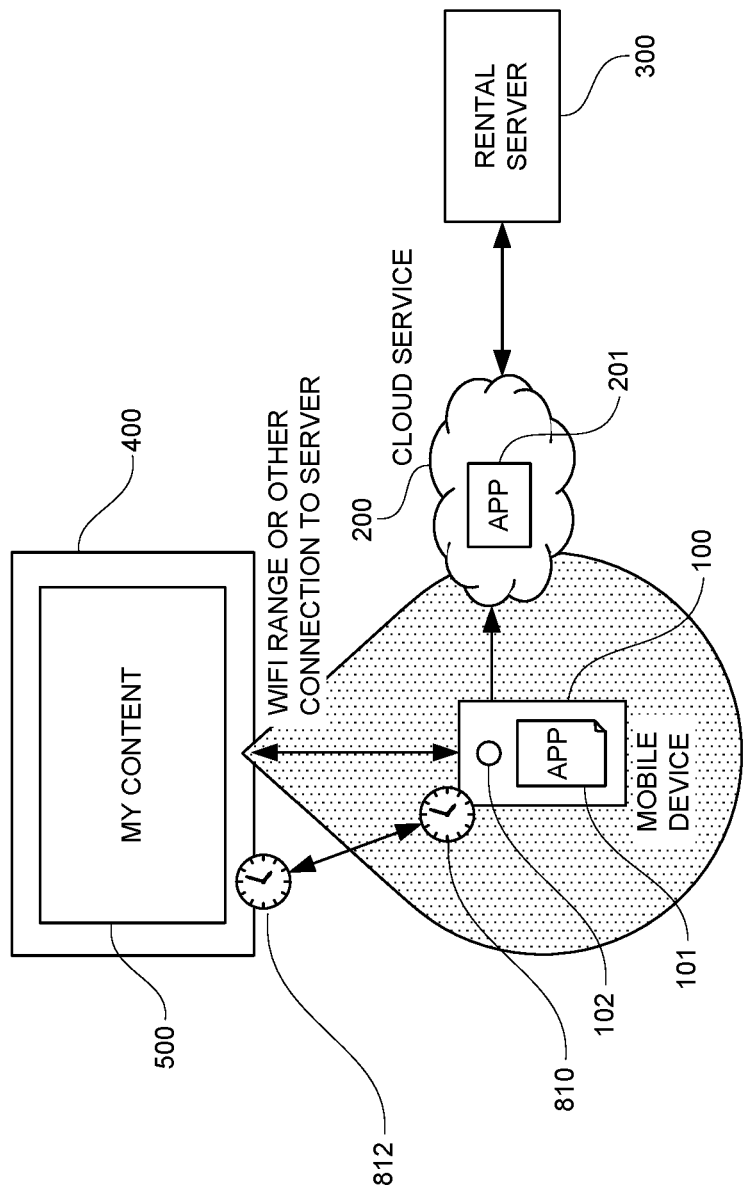
FIG. 8 is a block diagram depicting use of an electronic billboard according to a time-based synchronization operation in an Internet of Things ("IoT") computing environment according to an embodiment of the present invention.

In one aspect, the LED wall 400 and mobile device 100 of FIG. 4 may be synchronized via one or more synchronization operations such as, for example, a time-based synchronization operation, a content-based synchronization operation, trigger impulse, or a combination thereof as described in FIGS. 8-11. That is, the mobile device application 101 and the LED wall 400 may be synchronized, according to one or more operations of FIGS. 8-11, and the content 500 of FIG. 4 may be shown for a fraction of a second or other defined time period while simultaneously the camera 102 captures an image or video. The exact timing may be achieved via a clock time synchronization operation, as illustrated in FIG. 8.

Turning now to FIG. 8, a block diagram depicts the use of an electronic billboard for time-based synchronization according to a time-based synchronization operation in an Internet of Things ("IoT") computing environment such as, for example, the computing environment described in FIG. 4.

In one aspect, clock 810 of the mobile device 100 and clock 812 of LED wall 400 may be time synchronized. Once the camera 102 of the mobile device 100 is activated, the mobile device application 101 may negotiate a timestamp with the LED wall 400, which may be accomplished via a direct network connection or via the cloud service 200 and LED wall controller 401 (of FIG. 4) route to the LED wall 400. At the negotiated time, the LED wall 400 displays the new content 500 (e.g., new user-provided content) for a fraction of a second (thereby temporarily interrupting the primary content of the primary advertising user) in which also the camera 102 is triggered by the mobile device application 101 to capture the image and/or video.

Figure 9:
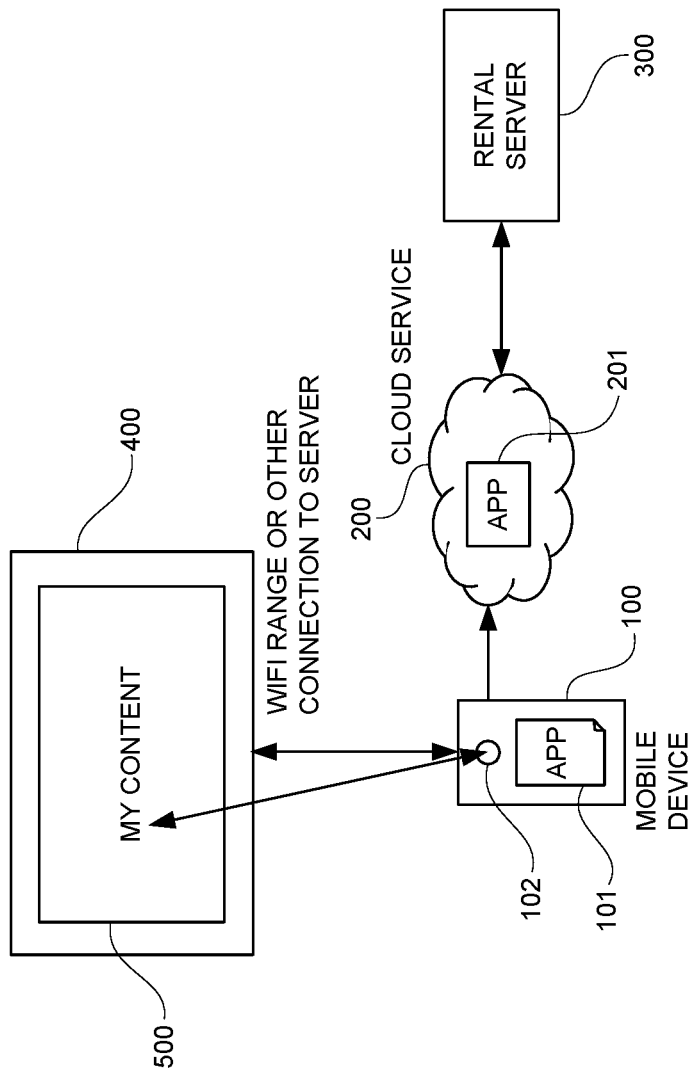
FIG. 9 is a block diagram depicting use of an electronic billboard according to a content-based synchronization operation in an Internet of Things ("IoT") computing environment according to an embodiment of the present invention.

FIG. 9 is a block diagram depicting use of an electronic billboard for content-based synchronization according to a content-based synchronization operation in an Internet of Things ("IoT") computing environment such as, for example, the computing environment described in FIG. 4. The mobile device application 101 may be aware and knows of the uploaded user-provided content that should be displayed on the LED wall 400. The mobile device camera 102 and the application 101 are able to detect the currently displayed LED wall 400 content 500 via frame grabbing. The mobile device camera 102 and the application 101 may compare the currently recorded picture with the formerly uploaded content. As soon as the mobile device camera 102 detects the new content, the mobile device camera 102 takes the picture. In this way, a time-synchronization operation may be eliminated while also maintaining the selected time period for displaying the user-provided content on the LED wall 400 is minimized and/or within the allocated time frame for capturing an image and/or video of the new user-provided content displayed on the LED wall 400. The LED wall 400 may be informed by the mobile device application 101, via the network connectors 204, 304, that the picture was taken, or LED wall controller 401 (of FIG. 4) resets the content (back to the primary displayed content) after a time threshold or selected time period. The timings of displaying the content and capturing the picture can also be optimized by handshaking between the camera 102 and LED wall 400 so as to enable the camera 102 and needed period of exposure time. That is, the timings may be related to the given light conditions. For example, at very bright locations (e.g., sunny or well-lighted area) an auto configuration of a camera may select a shorter exposure time, while in dark surroundings the exposure time for taking the picture may be longer. In one aspect, the exposure times may be in milliseconds but may still adjust the usage of the video wall by the 3rd party to a minimum and still achieve the desired results. In one aspect, it may be possible to swap content, capture pictures, and swap to original content using the mechanisms of the illustrated embodiments without others recognizing it just by optimizing the synchronization with the camera and the LED wall 400.

Figure 10:
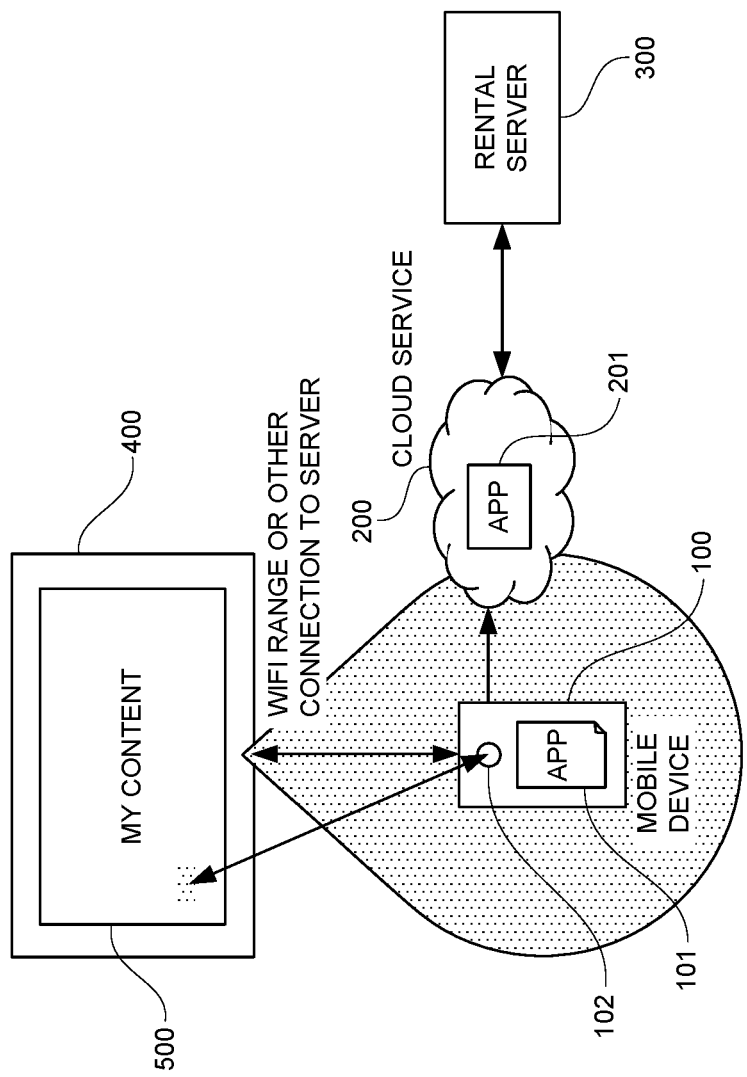
FIG. 10 is a block diagram depicting use of an electronic billboard according to a steganography synchronization operation in an Internet of Things ("IoT") computing environment according to an embodiment of the present invention.

FIG. 10 is a block diagram depicting use of an electronic billboard for steganography based synchronization according to a steganography synchronization operation in an Internet of Things ("IoT") computing environment such as, for example, the computing environment described in FIG. 4. FIG. 10 depicts use of steganography to provide machine readable data as part of the picture, which may be invisible to a human eye. The primary or standard displayed content is rendered with additional details while the new content 500 is displayed during the interruption time period. The mobile device application 101 captures the images and/or video gathered from the camera 102 and attempts to read the additional data packages in the picture displayed on LED wall 400. The mobile device application 101 interprets the read data and may synchronize the camera for a selected time period and activate the camera to take the image or video. At a designated and/or agreed upon time period, the LED wall 400 displays the new content 500 for a selected amount of time (e.g., a fraction of a second) in which also the camera 102 takes the picture of the LED wall 400. The LED wall 400 may be informed by the mobile device application 101, via the network connectors 204, 304, that the picture was taken, or the LED wall controller 401 resets the content (back to the primary displayed content) after a time threshold or selected time period. The timings of displaying the content and capturing the picture can also be optimized by handshaking between the camera 102 and LED wall 400 so as to enable the camera 102 and needed period of exposure time.

Figure 11:
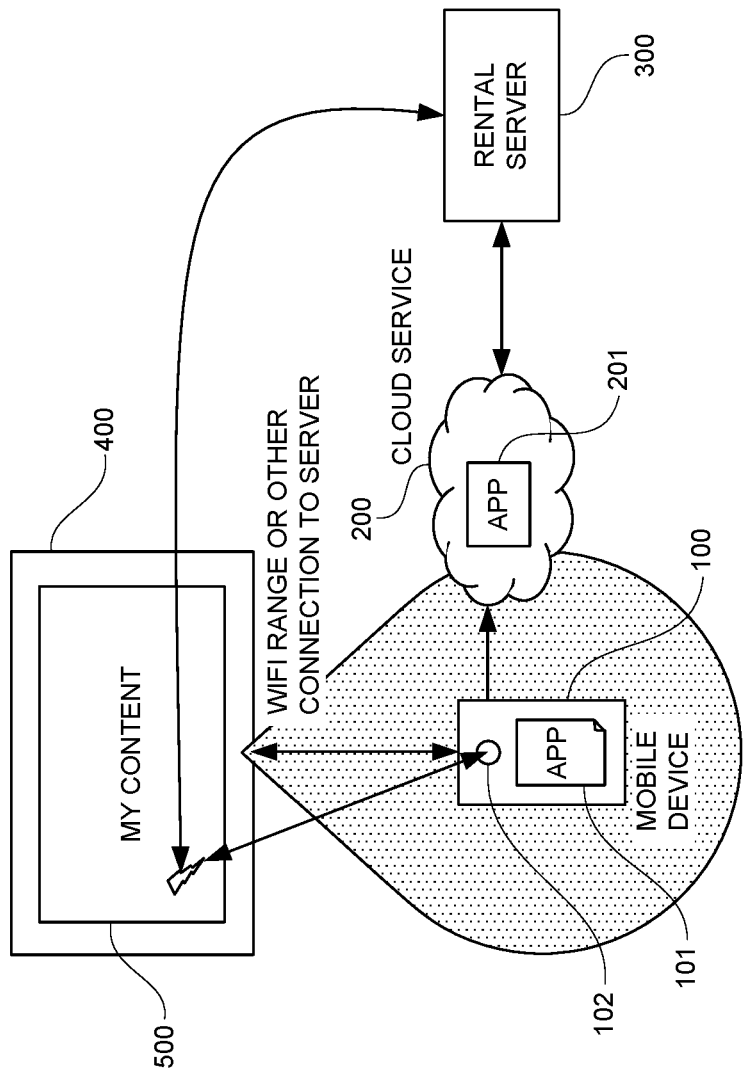
FIG. 11 is a block diagram depicting use of an electronic billboard according to a trigger impulse in an Internet of Things ("IoT") computing environment according to an embodiment of the present invention.

FIG. 11 is a block diagram depicting use of an electronic billboard for trigger based synchronization according to a trigger impulse in an Internet of Things ("IoT") computing environment such as, for example, the computing environment described in FIG. 4. The mobile device application 101 receives a trigger impulse from either the LED wall 400 or the cloud service 200 (e.g., via cloud service application 201), which communicates with the LED wall controller 401 once the content 500 is shown or displayed on the LED wall 400. This impulse may trigger the camera 102 of the mobile device 100 to capture an image or video. The impulse may be an application event that is sent by the LED wall 400 via a direct network connection to the mobile device 100 or via the network connection that the LED wall 400 has with the rental server 300 and the cloud service 200. It could also be a short flash in a certain color, on a certain position of the current content, which is detected by the camera 102 and is taken as a trigger to capture the image and/or video. The LED wall 400 may be informed by the mobile device application 101, via the network connectors 204, 304, that the image or video was captured, and/or the LED wall controller 401 resets the content after a certain time or time threshold. The timings of displaying the content and capturing the picture can also be optimized by handshaking between the camera 102 and LED wall 400 so as to enable the camera 102 and needed period of exposure time.

Figure 12A:
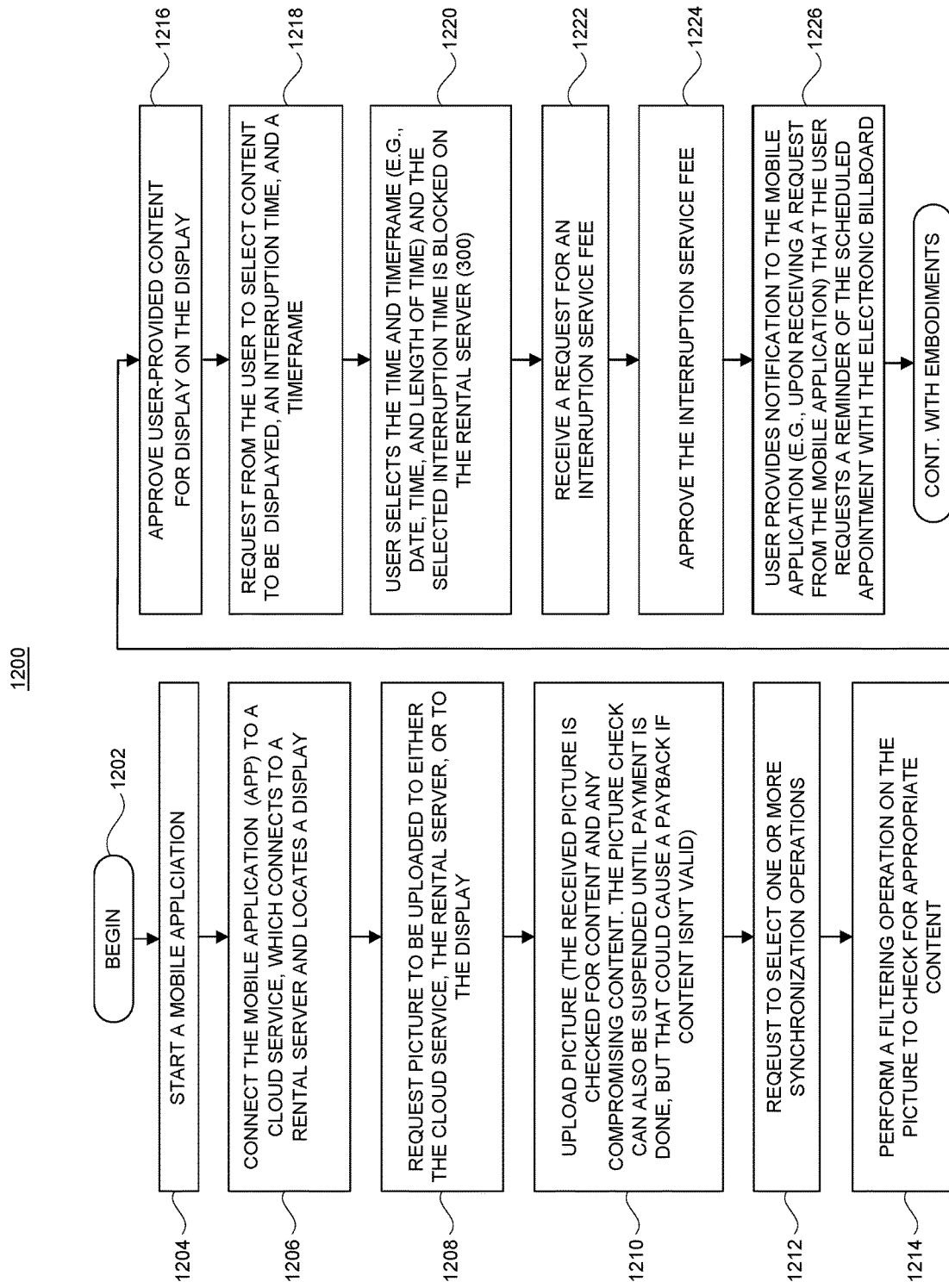
FIG. 12A-12B is a flowchart diagram of an additional exemplary method for using an electronic billboard according to a time-based synchronization operation in an Internet of Things ("IoT") computing environment by a processor, in which various aspects of the present invention may be realized.
Figure 12B:
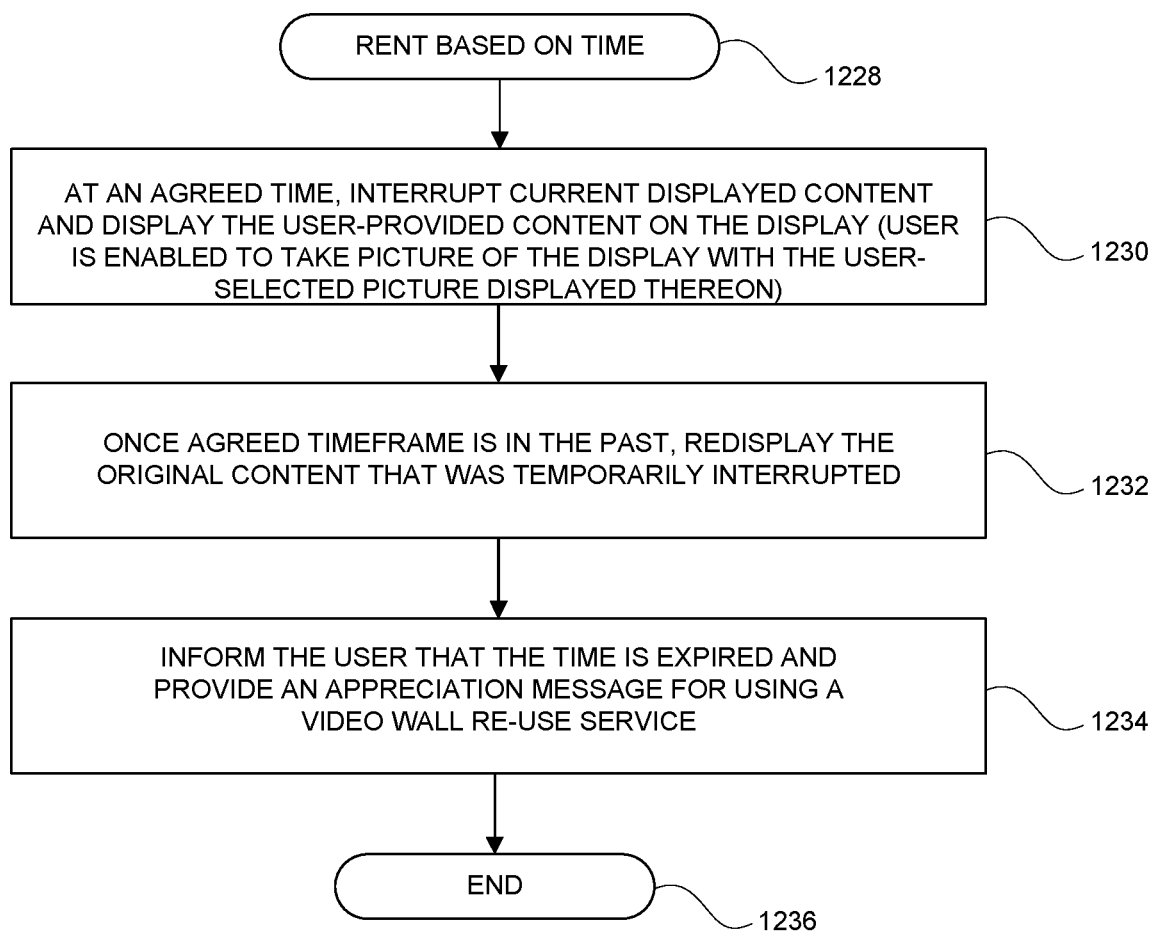

FIG. 12A-12B is a flowchart diagram of an additional exemplary method for using an electronic billboard according to a time-based synchronization operation in an Internet of Things ("IoT") computing environment by a processor. The functionality 1200 may be implemented as a method executed as instructions on a machine, where the instructions are included on at least one computer readable medium or on a non-transitory machine-readable storage medium. The functionality 1200 may start in block 1202. A mobile application (e.g., mobile application 101 started by a user of FIG. 4) of a mobile device may be started by a user, as in block 1204. The mobile application may establish a connection with a cloud computing service (e.g., cloud service 200), which connects to a rental server (e.g., rental server 300) and attempts to locate one or more electronic billboards (e.g., a video wall or LED wall 400), as in block 1206. The mobile application may request user-provided content (e.g., images, text, videos, etc.) from the user that is to be uploaded to the cloud computing service, the rental server, an electronic billboard, or a combination thereof, as in block 1208. The mobile application may upload the user-provided content, as in block 1210. A filtering operation may be performed on the user-provided content so as to cognitively interpret or determine the appropriateness of the user-provided content based on the plurality of identified contextual factors such as, for example, interpreting legal, ethical, moral, or courteous ones of the contextual factors in view of the user-provided content. In short, the filtering operation may determine if the user-provided content contains data, images, videos, or audio data that may be inappropriate for a public setting or create a possible negative impact upon one or more persons. The user-provided content may also be suspended pending payment of an interruption service fee.

Thus, the mobile application may request from the user to select one or more synchronization operations (see FIGS. 8-10), as in block 1212. The user may also select lighting conditions, camera angle and/or distance to a video wall. A filtering operation may be performed on the picture to check for appropriate content, as in block 1214. Also, depending on the selection of the one or more synchronization operations and the interruption service fee, a former picture check previously performed to filter and approve the picture (e.g., approval, filtering, and/or content check) may be prioritized by sending the former picture check information relating to a server handling the filtering. Upon completion of the filtering operation, the user-provided content is approved for display on the electronic billboard, as in block 1216.

The mobile application may request from the user to select content to be displayed on the LED wall 400, interruption time to use the electronic billboard (e.g., LED wall 400), and a timeframe (e.g., day, time, and length of time for displaying the user-provided content), as in block 1218. Responding to the mobile application request in block 1218, the user may select the time and timeframe (e.g., date, time, and length of time) and the selected interruption time is blocked on the rental server of the mobile application 101, as in block 1220. If the mobile application 101 is only connected to the LED wall 400 and not the rental server, the LED wall 400 may activate or use an active data connection to the rental server 300 to block the time. As such, a data connection (e.g., wireless communication link) may be active and/or enabled between the electronic billboard and the rental server so as to schedule and block out the selected interruption time.

The mobile application may request from the user for an interruption service fee using one of a variety of operations, as in block 1222. The interruption service fee may be approved, as in block 1224. Also, the approval of the interruption service fee may be provided to the rental server. If the mobile application is indirectly connected to the electronic billboard, the user-provided content (e.g., an image) may be sent to the electronic billboard with confirmation of delivery provided back to the mobile application.

The user may provide notification to the mobile application (e.g., upon receiving a request from the mobile application) that the user requests a reminder of the scheduled appointment with the electronic billboard, as in block 1226. If the user requests the notification, the mobile application schedules and delivers the notification at the appropriate time. The electronic billboard may be rented based on a selected interruption time, as in block 1228. Upon scheduling the temporary interruption of currently displayed content on a billboard based on a selected time, the electronic billboard temporarily interrupts the currently displayed content and displays the user-provided content, as in block 1230. The user is now enabled to capture an image and/or video of the user-provided content on the electronic billboard.

Upon expiration or conclusion of the agreed timeframe, the electronic billboard resumes displaying the content that was previously interrupted (e.g., the primary content), as in block 1232. The mobile application may inform the user that the scheduled time expired (e.g., has now concluded) and provide an appreciation message for using a video wall re-use service, as in block 1234. The functionality 1200 may end in block 1236.

Figure 13:
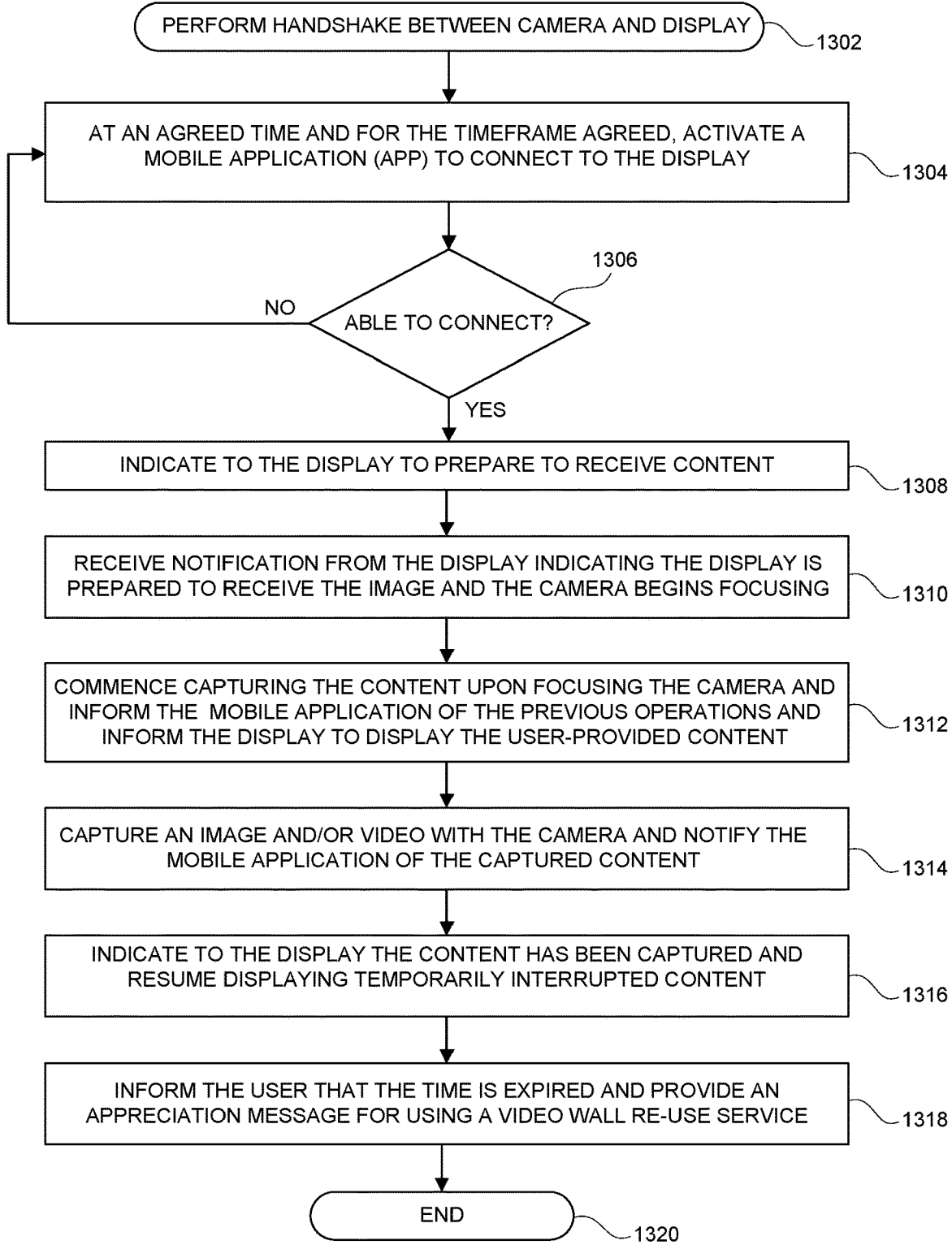
FIG. 13 is a flowchart diagram of an additional exemplary method for using an electronic billboard according to a handshaking operation in an Internet of Things ("IoT") computing environment by a processor, in which various aspects of the present invention may be realized.

FIG. 13 is a flowchart diagram of an additional exemplary method for using an electronic billboard according to a handshaking operation in an Internet of Things ("IoT") computing environment by a processor. The functionality 1300 may be implemented as a method executed as instructions on a machine, where the instructions are included on at least one computer readable medium or on a non-transitory machine-readable storage medium. The functionality 1300 may perform a handshaking operation between a mobile device (e.g., camera of the mobile device such as camera 102 of FIG. 4) and a video wall (e.g., electronic billboard or LED wall 400 of FIG. 4), as in block 1302.

At the scheduled and agreed upon time and timeframe, a mobile application may be activated (e.g., open the application) to connect to the display, as in block 1304. That is, the user may open, on the mobile device, a mobile application (e.g., mobile application 101) and the mobile application may connect to a display (e.g., a video wall such as, for example, LED wall 400). A determination operation is performed to determine if the connection was successful, as in block 1306. If no, the functionality may return to block 1304. If yes, the mobile application may indicate to the display to prepare to receive content, as in block 1308. That is, the mobile application 101 indicates to the display (e.g., LED wall 400) to prepare (e.g., get ready) to receive user-provided content (e.g., an image).

A notification is received from the display indicating the display is prepared to receive the image and the camera begins focusing, as in block 1310. That is, the video wall (e.g., LED wall 400) replies to the mobile application that the video wall (e.g., LED wall 400) is prepared (e.g., activated). The camera on the mobile device may also be activated and focus the camera. The user may commence capturing an image and/or video upon focusing the camera and inform the mobile application of the previous operations and inform the display (e.g., LED wall 400) to display the user-provided content, as in block 1312. The user may capture an image and/or video with the camera and notify the mobile application of the captured content (e.g., the image and/or video), as in block 1314. The mobile application indicates to the display (e.g., LED wall 400) that the content has been captured and indicates to the display to resume displaying the temporarily interrupted content (e.g., the primary content that was interrupted by the user-provided content), as in block 1316. The mobile application may inform the user that the scheduled time expired (e.g., has now concluded) and provide an appreciation message for using a video wall re-use service, as in block 1318. The functionality 1300 may end in block 1320.

Figure 14:
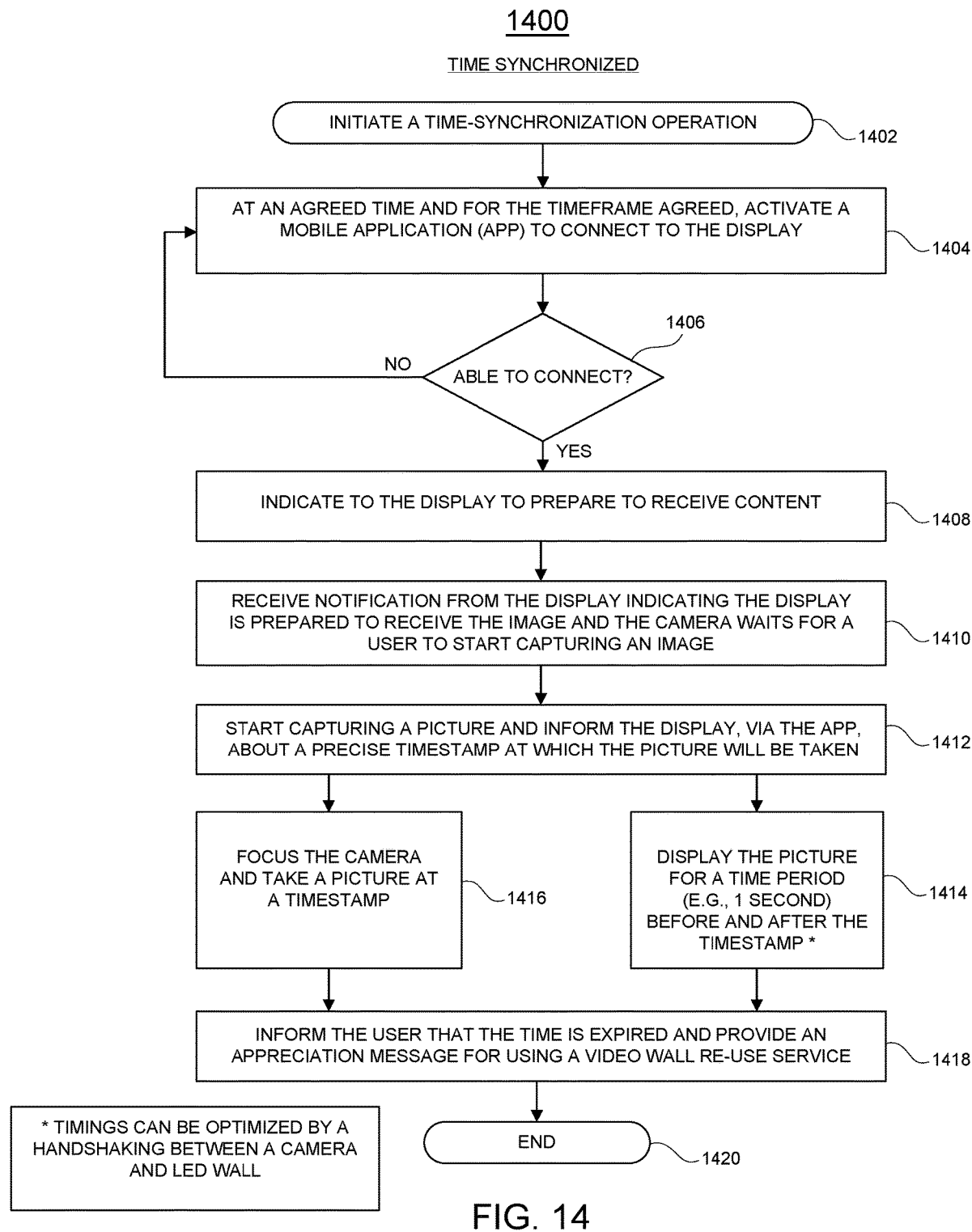
FIG. 14 is a flowchart diagram of an additional exemplary method for using an electronic billboard according to a time-based synchronization operation in an Internet of Things ("IoT") computing environment by a processor, in which various aspects of the present invention may be realized.

FIG. 14 is a flowchart diagram of an additional exemplary method for using an electronic billboard according to a time-based synchronization operation in an Internet of Things ("IoT") computing environment by a processor. The functionality 1400 may be implemented as a method executed as instructions on a machine, where the instructions are included on at least one computer readable medium or on a non-transitory machine-readable storage medium. The functionality 1400 may start a time-synchronization operation, as in block 1402. At the scheduled and agreed upon time and timeframe, a mobile application may be activated (e.g., open the application) to connect to the display, as in block 1404. That is, the user may open, on the mobile device, a mobile application (e.g., mobile application 101) and the mobile application may connect to the display (e.g., LED wall 400). A determination operation is performed to determine if the connection was successful, as in block 1406.

If no, the functionality may return to block 1404. If yes, the mobile application may indicate to the display to prepare to receive content, as in block 1408. That is, the mobile application 101 indicates to the video wall (e.g., LED wall 400) to prepare (e.g., get ready) to receive user-provided content (e.g., an image). The mobile application 101 and the video wall (e.g., LED wall 400) are both time-synchronized with NTP or an alternative time synchronization operation.

A notification is received from the display indicating the display is prepared to receive the image and the camera waits until the user starts capturing an image (or video), as in block 1410. For example, the video wall (e.g., LED wall 400) replies to the mobile application that the display (e.g., LED wall 400) is prepared (e.g., activated) and the camera of the mobile device is activated and waits for the user to commence capturing an image and/or video. The user may commence capturing an image and/or video and the mobile application may inform the display (e.g., LED wall 400) of a selected timestamp (e.g., a precise timestamp) at which times the images and/or videos will be captured, as in block 1412.

From block 1412, the display (e.g., LED wall 400) displays the user-provided content (e.g., picture or content 500) for a selected time period (e.g., at least one second) before and after the timestamp, as in block 1414. In relation to blocks 1412 and 1414, in the process of commencing taking a picture, at least two functions or steps with the cameras in a mobile device can be used. Step 1) The user may touch the screen (e.g., GUI) to ask the camera to focus on a selected location. Also, the user may release the finger from a screen and the camera may complete the set up or focus. Step 2) The user may select to capture and take a picture using a selection means (e.g., button) on the camera and the camera, in auto mode, may set or correct the focus, the iris, and/or the shutter. Once the set up or correction operations are complete the capturing of the picture may be started.

Simultaneously with the execution of block 1414, the mobile application may inform the camera to focus and capture an image and/or video of the user-provided content at the selected timestamp, as in block 1416. That is, timings can be optimized by also handshaking with the camera and the LED wall. For example, depending on the light, the camera may leave the shutter open for a longer or shorter period of time. A selected time (e.g., 1 or 2 seconds) may be used which the video wall displays the 3rd party picture depending on the lighting conditions. The camera may be triggered via the mobile application to capture a test picture (without synchronizing with the video wall) in advance to obtain a close timing of how long the real shot will take (e.g., duration time for capturing a picture). This determined time (e.g., time to take the test picture) may be sent to the video wall instead of the selected or predetermined time period.

The mobile application may inform the user that the scheduled time expired (e.g., has now concluded) and provide an appreciation message for using a video wall re-use service, as in block 1418. The functionality 1400 may end in block 1420.

Figure 15:
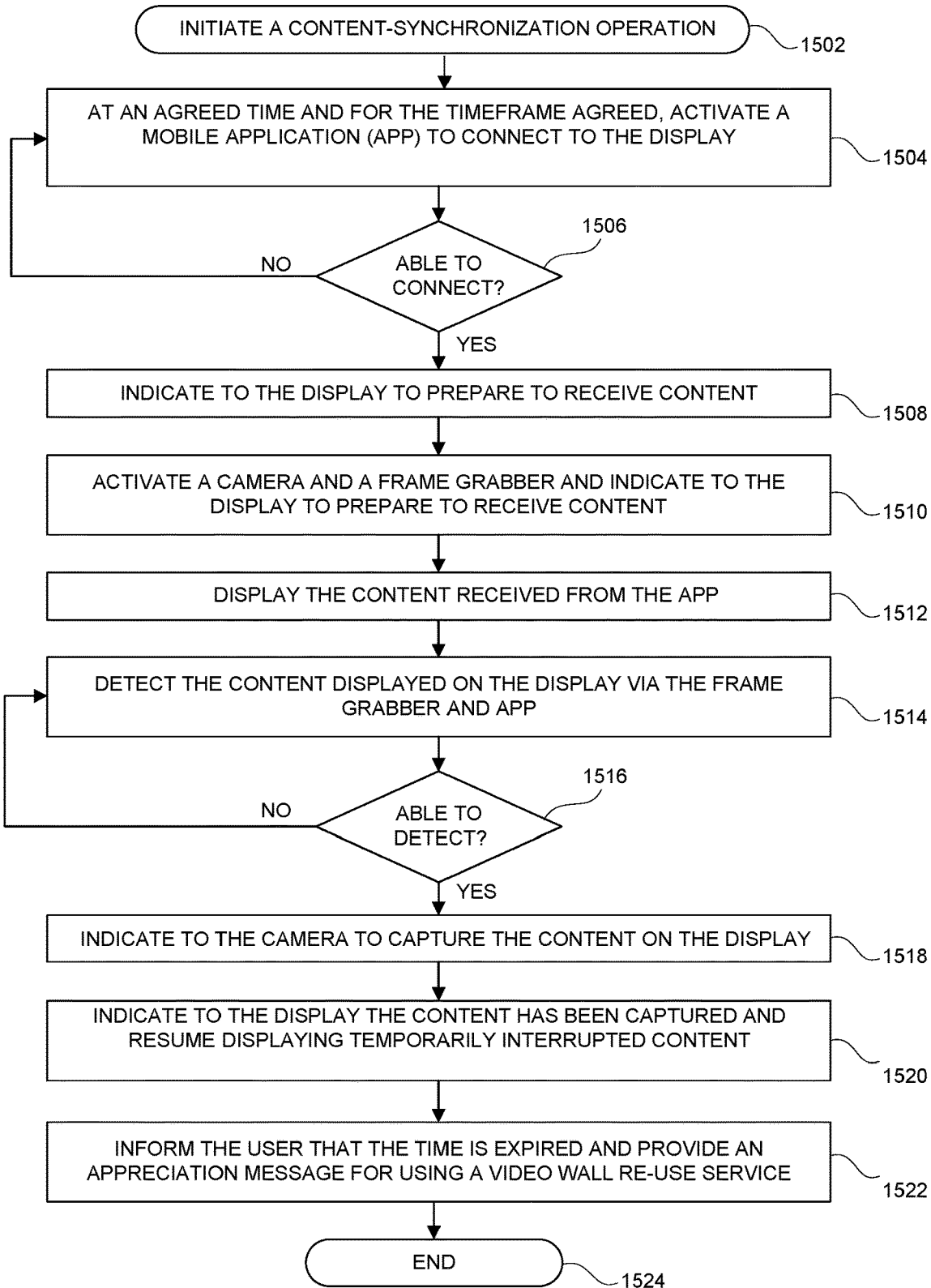
FIG. 15 is a flowchart diagram of an additional exemplary method for using an electronic billboard according to a content-based synchronization operation in an Internet of Things ("IoT") computing environment by a processor, in which various aspects of the present invention may be realized.

FIG. 15 is a flowchart diagram of an additional exemplary method for using an electronic billboard according to a content-based synchronization operation in an Internet of Things ("IoT") computing environment by a processor. The functionality 1500 may be implemented as a method executed as instructions on a machine, where the instructions are included on at least one computer readable medium or on a non-transitory machine-readable storage medium.

The functionality 1500 may start in block 1502 for a content-synchronization operation.

At the scheduled and agreed upon time and timeframe, the user may open, on the mobile device, a mobile application (e.g., mobile application 101) and the mobile application may connect to the display (e.g., LED wall 400), as in block 1504. A determination operation is performed to determine if the connection was successful, as in block 1506. If no, the functionality may return to block 1504. If yes, the mobile application may indicate to the display to prepare to receive content, as in block 1508. For example, the mobile application may indicate to the display (e.g., LED wall 400) to prepare (e.g., get ready) to receive user-provided content (e.g., an image).

The mobile application activates the camera and a frame grabber and indicates to the display to prepare to receive content, as in block 1510. The display may display the content received from the mobile application, as in block 1512. For example, the display (e.g., LED wall 400) displays the user-provided content (e.g., picture or content 500) for a selected time period (e.g., at least one second). The content displayed on the display may be detected by the frame grabber and mobile application, as in block 1514. For example, the mobile application, with the assistance of the frame grabber, detects the user-provided content (which is now displayed on the video wall). A determination operation is performed to determine if the user-provided content was detected, as in block 1516. If no, the functionality may return to block 1514. If yes, the mobile application may inform the camera to capture the content (e.g., the image and/or video) displayed on the display, as in block 1518. The mobile application indicates to the display (e.g., LED wall 400) that the content has been captured and enables the display to resume displaying the temporarily interrupted content (e.g., the primary content that was interrupted by the user-provided content), as in block 1520. The mobile application may inform the user that the scheduled time expired (e.g., has now concluded) and provide an appreciation message for using a video wall re-use service, as in block 1522. The functionality 1500 may end in block 1524.

Figure 16:
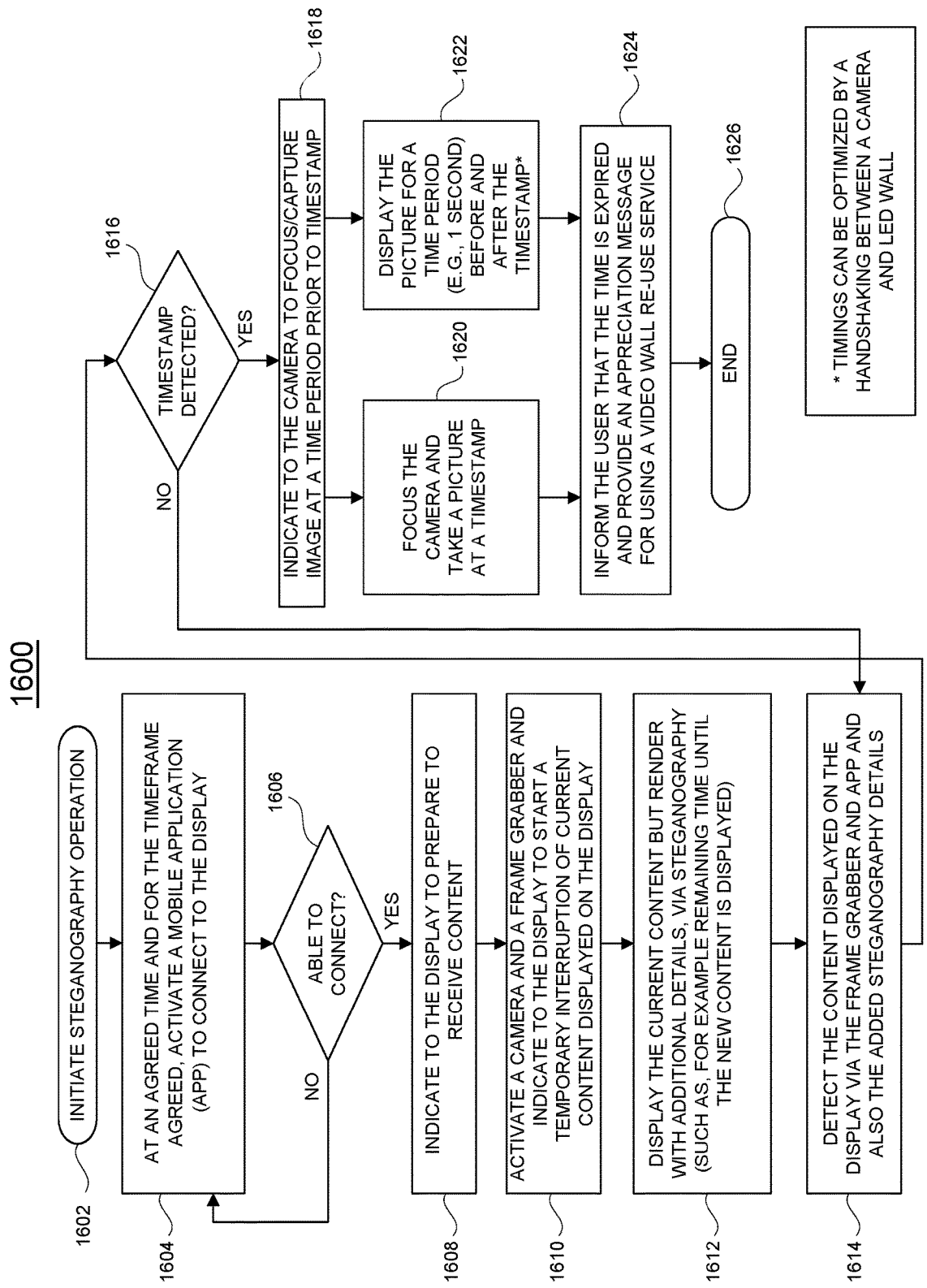
FIG. 16 is a flowchart diagram of an additional exemplary method for using an electronic billboard according to a steganography synchronization operation in an Internet of Things ("IoT") computing environment by a processor, in which various aspects of the present invention may be realized.

FIG. 16 is a flowchart diagram of an additional exemplary method for using an electronic billboard according to a steganography synchronization operation in an Internet of Things ("IoT") computing environment by a processor. The functionality 1600 may be implemented as a method executed as instructions on a machine, where the instructions are included on at least one computer readable medium or on a non-transitory machine-readable storage medium. The functionality 1600 may start in block 1602 for a steganography synchronization operation. At the scheduled and agreed upon time and timeframe, the user may open, on the mobile device, a mobile application (e.g., mobile application 101) and the mobile application may connect to the display (e.g., video wall such as, for example, the LED wall 400), as in block 1604. A determination operation is performed to determine if the connection was successful, as in block 1606. If no, the functionality may return to block 1604. If yes, the mobile application may indicate to the display to prepare to receive content, as in block 1608.

The mobile application activates the camera and a frame grabber and provides notification to the display to start the temporary interruption of the currently displayed content on the display (e.g., LED wall 400), as in block 1610. The display may display the current content that is interrupted on the display, but rendered with additional details via a steganography, as in block 1612. For example, the video wall (e.g., LED wall 400) may display the currently displayed content but also include additional details via a steganography operation such as, for example, the amount of time remaining prior to displaying user-provided content.

The content displayed on the display may be detected via the frame grabber and app and also the added steganography details, as in block 1614. The mobile application, with the assistance of the frame grabber, detects the user-provided content (which is now displayed on the video wall) and the added steganography details. A determination operation is performed to determine if a timestamp was detected, as in block 1616. If no, the functionality may return to block 1614. If yes, at block 1618, at a predetermined time period prior to the timestamp (e.g., at 5 seconds before the given timestamp), the mobile application may indicate to the camera to focus the camera and capture an image. From block 1618, the display (e.g., LED wall 400) displays the user-provided content (e.g., picture or content 500) for a selected time period (e.g., at least one second) before and after the timestamp, as in block 1622. Simultaneously with the execution of block 1622, the mobile application may focus to capture an image and/or video of the user-provided content at the selected timestamp, as in block 1620. The mobile application may inform the user that the scheduled time expired (e.g., has now concluded) and provide an appreciation message for using a video wall re-use service, as in block 1624. The functionality 1600 may end in block 1626.

Figure 17:
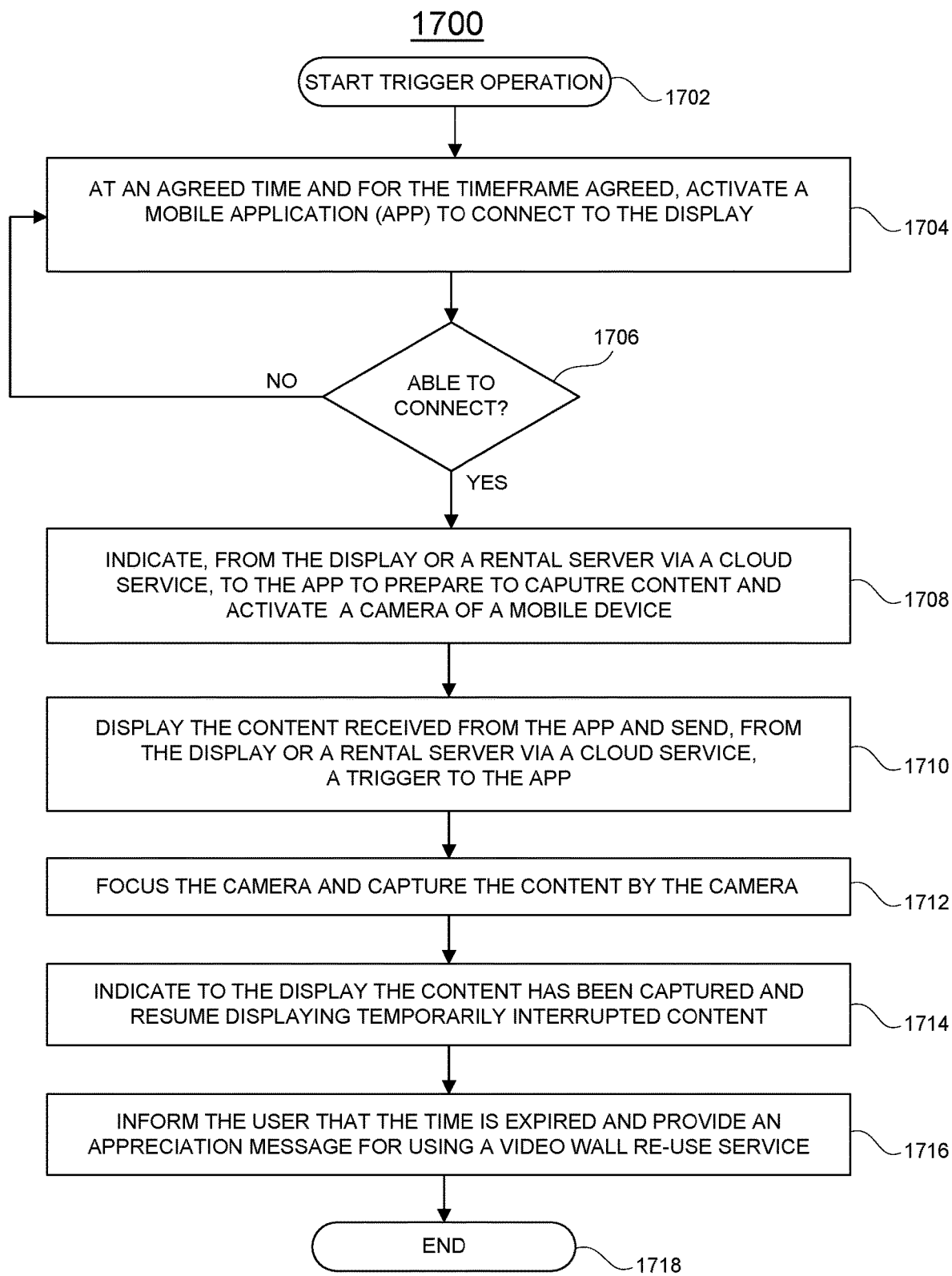
FIG. 17 is a flowchart diagram of an additional exemplary method for using an electronic billboard according to a trigger impulse in an Internet of Things ("IoT") computing environment by a processor, in which various aspects of the present invention may be realized.

FIG. 17 is a flowchart diagram of an additional exemplary method for using an electronic billboard according to a trigger impulse in an Internet of Things ("IoT") computing environment by a processor. The functionality 1700 may be implemented as a method executed as instructions on a machine, where the instructions are included on at least one computer readable medium or on a non-transitory machine-readable storage medium. The functionality 1700 may start a trigger impulse operation, at block 1702. At a scheduled and agreed upon time and timeframe, the user may open, on the mobile device, a mobile application (e.g., mobile application 101) and the mobile application may connect to the display (e.g., LED wall 400), as in block 1704. A determination operation is performed to determine if the connection was successful, as in block 1706. If no, the functionality may return to block 1704. If yes, the display (e.g., LED wall 400) and/or a rental server (e.g., rental server 300 of FIG. 4) may inform, via a cloud computing service (e.g., cloud service 300 of FIG. 4), the mobile application to prepare (e.g., get ready) to capture (and/or send) the user-provided content (e.g., an image) and to activate a camera of a mobile device, as in block 1708. The display (e.g., LED wall 400) displays the user-provided content (e.g., the picture or content 500) and the display (e.g., LED wall 400) and/or the rental server, via the cloud computing service (e.g., cloud service 200 of FIG. 4), sends a trigger (e.g., a trigger impulse that the user-provided content is displayed) to the mobile application, as in block 1710. The mobile application may indicate to the camera to focus the camera and capture the content (e.g., an image and/or video), as in block 1712. The mobile application indicates to the display (e.g., LED wall 400) that the content has been captured and indicates to the display to resume displaying the temporarily interrupted content (e.g., the primary content that was interrupted by the user-provided content), as in block 1714. The mobile application may inform the user that the scheduled time expired (e.g., has now concluded) and provide an appreciation message for using a video wall re-use service, as in block 1716. The functionality 1700 may end in block 1718.

Figure 18:
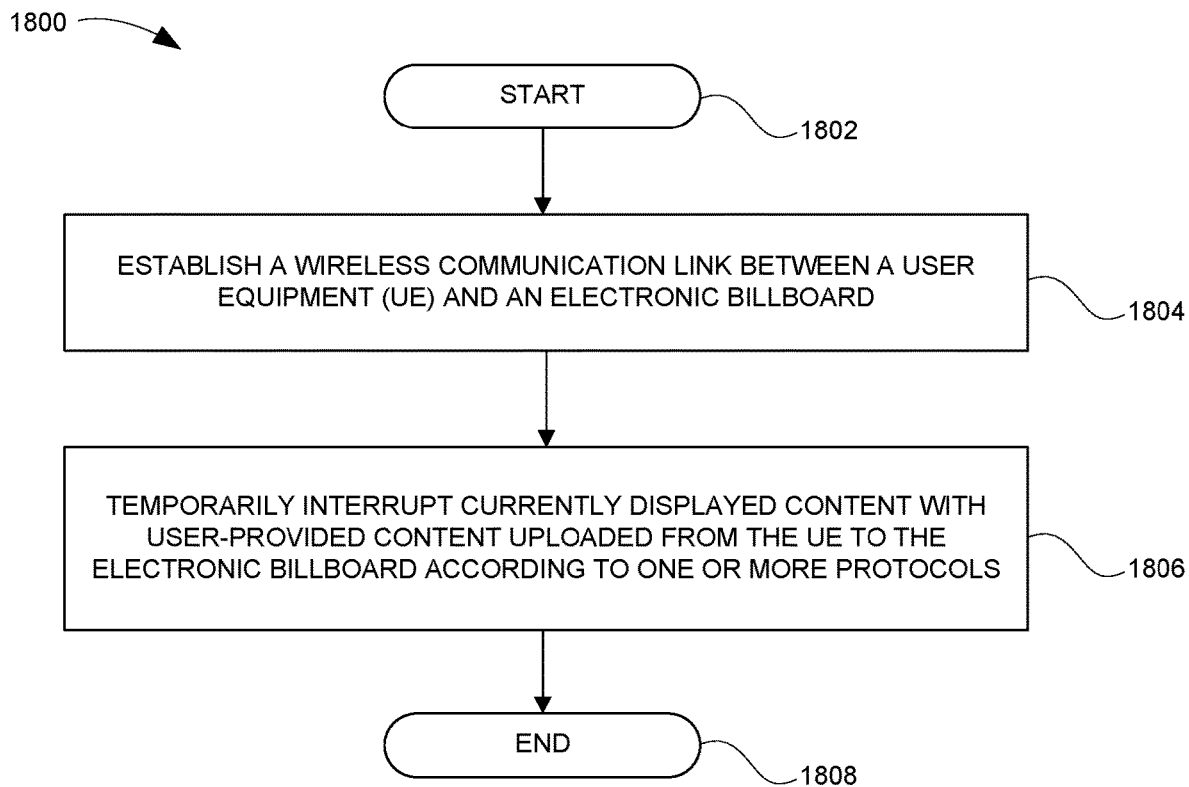
FIG. 18 is a flowchart diagram of an additional exemplary method for using an electronic billboard in an Internet of Things ("IoT") computing environment by a processor, in which various aspects of the present invention may be realized.

FIG. 18 is a flowchart diagram of an additional exemplary method for using an electronic billboard in an Internet of Things ("IoT") computing environment by a processor. The functionality 1800 may be implemented as a method executed as instructions on a machine, where the instructions are included on at least one computer readable medium or on a non-transitory machine-readable storage medium. The functionality 1800 may start in block 1802. A wireless communication link may be established between a user equipment (UE) and an electronic billboard (e.g., video wall such as, for example, LED wall 400), as in block 1804. Currently displayed content may be temporarily interrupted with user-provided content uploaded from the UE to the electronic billboard according to one or more protocols, as in block 1806. The functionality 1800 may end in block 1808.

In one aspect, in conjunction with and/or as part of at least one block of FIG. 18, the operations of 1800 may include each of the following. The operations of 1800 may select the user-provided content from the UE or a storage system associated with the UE and determine an interruption time for temporarily interrupting the currently displayed content with user-provided content. An interruption time may be determined according to the one or more protocols. The one or more protocols may include an interruption service fee, a geographical proximity between the UE and the electronic billboard, a handshaking operation between the UE and the electronic billboard, a time-based synchronization operation, a content-based synchronization operation, a steganography synchronization operation, a trigger impulse, or a combination thereof.

The operations of 1800 may activate an image capture device on the UE in conjunction with displaying the user-provided content on the electronic billboard during the temporary interruption, capture, on the UE, an image of the user-provided content while the user-provided content is displayed on the electronic billboard during the temporary interruption, and display, on the UE, the captured image having the user-provided content displayed on the electronic billboard.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for using an electronic billboard in an Internet of Things ("IoT") computing environment, comprising:
    establishing a wireless communication link between a user equipment (UE) and the electronic billboard;
    responsive to establishing the wireless communication link, temporarily interrupting currently displayed content on the electronic billboard to display user-provided content uploaded from the UE to the electronic billboard according to one or more protocols; wherein upon expiration or conclusion of an agreed-to timeframe for the temporary interruption, the electronic billboard resumes displaying the currently displayed content that was previously interrupted; and
    in conjunction with displaying the user-provided content, activating an image capture device on the UE, wherein content captured by the image capture device of the UE at least partially comprises the user-provided content transmitted to and displayed by the electronic billboard during the temporary interruption.

2. The method of claim 1, further including selecting the user-provided content from the UE or a storage system associated with the UE.

3. The method of claim 1, further including determining an interruption time for temporarily interrupting the currently displayed content with user-provided content.

4. The method of claim 3, wherein the interruption time is determined according to the one or more protocols, wherein the one or more protocols include an interruption service fee, a geographical proximity between the UE and the electronic billboard, a handshaking operation between the UE and the electronic billboard, a time-based synchronization operation, a content-based synchronization operation, a steganography synchronization operation, a trigger impulse, or a combination thereof.

5. The method of claim 1, further including capturing, on the UE, an image of the user-provided content while the user-provided content is displayed on the electronic billboard during the temporary interruption.

6. The method of claim 1, further including displaying, on the UE, the captured image having the user-provided content displayed on the electronic billboard.

7. A system for using an electronic billboard in an Internet of Things ("IoT") computing environment, comprising:
    one or more computers with executable instructions that when executed cause the system to:
        establish a wireless communication link between a user equipment (UE) and the electronic billboard;
        responsive to establishing the wireless communication link, temporarily interrupt currently displayed content on the electronic billboard to display user-provided content uploaded from the UE to the electronic billboard according to one or more protocols; wherein upon expiration or conclusion of an agreed-to timeframe for the temporary interruption, the electronic billboard resumes displaying the currently displayed content that was previously interrupted; and
        in conjunction with displaying the user-provided content, activate an image capture device on the UE, wherein content captured by the image capture device of the UE at least partially comprises the user-provided content transmitted to and displayed by the electronic billboard during the temporary interruption.

8. The system of claim 7, wherein the executable instructions further select the user-provided content from the UE or a storage system associated with the UE.

9. The system of claim 7, wherein the executable instructions further determine an interruption time for temporarily interrupting the currently displayed content with user-provided content.

10. The system of claim 9, wherein the interruption time is determined according to the one or more protocols, wherein the one or more protocols include an interruption service fee, a geographical proximity between the UE and the electronic billboard, a handshaking operation between the UE and the electronic billboard, a time-based synchronization operation, a content-based synchronization operation, a steganography synchronization operation, a trigger impulse, or a combination thereof.

11. The system of claim 7, wherein the executable instructions further capture, on the UE, an image of the user-provided content while the user-provided content is displayed on the electronic billboard during the temporary interruption.

12. The system of claim 7, wherein the executable instructions further display, on the UE, the captured image having the user-provided content displayed on the electronic billboard.

13. A computer program product for using an electronic billboard in an Internet of Things ("IoT") computing environment by a processor, the computer program product comprising a non-transitory computer-readable storage medium having computer-readable program code portions stored therein, the computer-readable program code portions comprising:
    an executable portion that establishes a wireless communication link between a user equipment (UE) and the electronic billboard;

an executable portion that, responsive to establishing the wireless communication link, temporarily interrupts currently displayed content on the electronic billboard to display user-provided content uploaded from the UE to the electronic billboard according to one or more protocols; wherein upon expiration or conclusion of an agreed-to timeframe for the temporary interruption, the electronic billboard resumes displaying the currently displayed content that was previously interrupted; and an executable portion that, in conjunction with displaying the user-provided content, activates an image capture device on the UE, wherein content captured by the image capture device of the UE at least partially comprises the user-provided content transmitted to and displayed by the electronic billboard during the temporary interruption.

14. The computer program product of claim 13, further including an executable portion that selects the user-provided content from the UE or a storage system associated with the UE.

15. The computer program product of claim 13, further including an executable portion that determines an interruption time for temporarily interrupting the currently displayed content with user-provided content according to the one or more protocols, wherein the one or more protocols include an interruption service fee, a geographical proximity between the UE and the electronic billboard, a handshaking operation between the UE and the electronic billboard, a time-based synchronization operation, a content-based synchronization operation, a steganography synchronization operation, a trigger impulse, or a combination thereof.

16. The computer program product of claim 13, further including an executable portion that captures, on the UE, an image of the user-provided content while the user-provided content is displayed on the electronic billboard during the temporary interruption.

17. The computer program product of claim 13, further including an executable portion that displays, on the UE, the captured image having the user-provided content displayed on the electronic billboard.

* * * * *